US011131311B2

(12) United States Patent
Diehl

(10) Patent No.: US 11,131,311 B2
(45) Date of Patent: *Sep. 28, 2021

(54) MOTOR-FAN ASSEMBLY WITH IMPROVED AIRFLOW AND NOISE REDUCTION PROPERTIES

(71) Applicant: AMETEK, INC., Berwyn, PA (US)

(72) Inventor: Kris D. Diehl, Berlin Center, OH (US)

(73) Assignee: Ametek, Inc., Berwyn, PA (US)

( * ) Notice: Subject to any disclaimer, the term of this patent is extended or adjusted under 35 U.S.C. 154(b) by 197 days.

This patent is subject to a terminal disclaimer.

(21) Appl. No.: 15/783,047

(22) Filed: Oct. 13, 2017

(65) Prior Publication Data

US 2019/0113045 A1  Apr. 18, 2019

(51) Int. Cl.
| | |
|---|---|
| *F04D 25/08* | (2006.01) |
| *F04D 25/06* | (2006.01) |
| *H02K 9/06* | (2006.01) |
| *F04D 29/42* | (2006.01) |
| *F04D 29/62* | (2006.01) |

(Continued)

(52) U.S. Cl.
CPC .......... *F04D 25/082* (2013.01); *F04D 25/06* (2013.01); *F04D 29/4206* (2013.01); *F04D 29/624* (2013.01); *H02K 9/06* (2013.01); *F04D 17/16* (2013.01); *F04D 29/663* (2013.01)

(58) Field of Classification Search
CPC ...... F04D 17/10; F04D 17/164; F04D 17/168; F04D 25/06–0613; F04D 25/064; F04D 25/08–082; F04D 17/16; F04D 29/4206; F04D 29/624; F04D 29/663; H02K 9/06

USPC ............... 417/366, 368, 423.2, 423.7, 423.8, 417/423.14, 424.1; 415/116, 117
See application file for complete search history.

(56) References Cited

U.S. PATENT DOCUMENTS 2,516,184 A   7/1950  Christie
2,726,807 A * 12/1955  Lewis ................. A47L 11/4044
                                                              415/119

(Continued)

FOREIGN PATENT DOCUMENTS

| CN | 203660756 U | * 6/2014 | |
| CN | 106401997 A | 2/2017 | ............ F04D 25/08 |
| DE | 937 611 C | 1/1956 | ............ F04D 25/08 |

OTHER PUBLICATIONS

Axial vs. Centrifugal Fans by Sam Pelonis (Year: 2015).*

(Continued)

*Primary Examiner* — Alexander B Comley
(74) *Attorney, Agent, or Firm* — Renner, Kenner, Greive, Bobak, Taylor & Weber

(57) ABSTRACT

A motor-fan assembly includes a motor assembly having a rotatable shaft extending therethrough and a working fan assembly having at least one working fan rotated by the rotatable shaft. The motor-fan assembly includes a motor cover that substantially encloses the motor assembly. The motor assembly provides a cover opening extending therethrough and the rotatable shaft extends through the opening. The motor-fan assembly also includes a cooling fan assembly with at least one cooling fan rotated by the rotatable shaft which fan draws cooling airflow over the motor assembly. A motor vent cover is coupled to the motor cover with the at least one cooling fan therebetween. The motor vent cover has a cooling air outlet through which cooling airflow is exhausted.

14 Claims, 27 Drawing Sheets

(51) Int. Cl.
*F04D 17/16* (2006.01)
*F04D 29/66* (2006.01)

(56) References Cited

U.S. PATENT DOCUMENTS

| | | | | |
|---|---|---|---|---|
| 2,822,123 | A * | 2/1958 | Cole | H02K 9/24 |
| | | | | 417/423.2 |
| 3,341,113 | A * | 9/1967 | Sebok | F04D 17/164 |
| | | | | 417/368 |
| 3,932,070 | A | 1/1976 | Porter et al. | 417/423 |
| 4,254,973 | A | 3/1981 | Benjamin | 285/312 |
| 4,518,325 | A * | 5/1985 | Kingston | A61H 33/028 |
| | | | | 417/368 |
| 6,166,462 | A | 12/2000 | Finkenbinder et al. | 310/63 |
| 6,439,843 | B1 | 8/2002 | Finkenbinder | 415/172.1 |
| 6,461,124 | B1 | 10/2002 | Morelli | 417/423.8 |
| 6,472,786 | B1 | 10/2002 | McCauley et al. | 310/90 |
| 6,561,772 | B2 | 5/2003 | Volkert et al. | 417/312 |
| 6,648,613 | B2 | 11/2003 | Clausson et al. | 417/423.1 |
| 6,695,580 | B2 | 2/2004 | Finkenbinder | 415/208.3 |
| 6,756,713 | B2 | 6/2004 | Diehl et al. | 310/71 |
| 8,226,384 | B2 | 7/2012 | Finkenbinder et al. | 417/423.14 |
| 8,317,497 | B2 | 11/2012 | Finkenbinder | 417/423.14 |
| 2006/0013712 | A1 * | 1/2006 | Lee | F04D 31/00 |
| | | | | 417/423.7 |
| 2007/0090710 | A1 * | 4/2007 | Chen | H02K 29/08 |
| | | | | 310/156.26 |
| 2008/0044277 | A1 | 2/2008 | Finkenbinder | 415/170.1 |
| 2013/0167826 | A1 | 7/2013 | Feld | 126/299 D |
| 2016/0222979 | A1 | 8/2016 | Hutson | F04D 29/441 |
| 2018/0172028 | A1 | 6/2018 | Kim et al. | F04D 29/5806 |

OTHER PUBLICATIONS

*Ametek Windjammer Blower publication*; 2017 (The year of publication is sufficiently earlier than the effective US filing date and any foreign priority so that the particular month of publication is not in issue).

European Search Report dated Mar. 6, 2019 in related application No. 18199850.1.

European Search Report dated Mar. 6, 2019 in related application No. 18199856.8.

* cited by examiner

MOTOR-FAN ASSEMBLY WITH IMPROVED AIRFLOW AND NOISE REDUCTION PROPERTIES

TECHNICAL FIELD

Generally, the present invention is directed to a motor-fan assembly. Specifically, the present invention is directed to a motor-fan assembly that utilizes a housing assembly with reverse motor cooling airflow and other associated structural features to improve motor cooling airflow properties that better cool the internal electronics, allows increased power and reduces fan noise. In particular, the present invention employs replaceable inserts to allow either ambient air or off-site filtered cooling air into and out of the housing assembly.

BACKGROUND ART

Motor-fan assemblies are well known for generation of a directed airflow. Applications using a directed airflow include, but are not limited to, material handling/drying, air sampling, cooling applications, ink drying, and cleaning systems.

FIG. 1 shows a Prior Art motor-fan assembly designated generally by the numeral 50. The assembly 50 includes a motor enclosure 52 with a motor section 54 connected to a fan section 56. A working air inlet 58 axially extends from the fan section 56 which carries a working fan assembly designated generally by the numeral 60. Air is drawn in through the inlet 58 and expelled out a tangential working air outlet 62. A motor blower bracket 64 connects the sections 54 and 56 to one another while keeping the working air isolated from the motor section. The motor section 54 includes a circuit board 66 which is supported by the motor blower bracket 64. Coupled to the circuit board 66 is a brushless motor 68 which includes a stator 70 and a rotor 72 which carries magnets in a manner well known in the art and wherein the rotor has extending therefrom a shaft 74 which extends through the motor blower bracket 64 and rotates the rotatable fans included in the working fan assembly 60. Also connected to the shaft 74 is a cooling fan 76 maintained in the motor section 54. The motor section 54 provides an axial cooling fan inlet 80 and a cooling fan outlet 82 which is typically radially directed from the motor section 54. Rotation of the cooling fan draws air into the motor section 54 through the inlet 80 for the purpose of cooling the stator 70, its associated windings, and the circuit board 66. The cooling airflow then exits through the outlet 82.

Although the Prior Art motor-fan assembly 50 is effective, it experiences performance issues that are fairly well known. The first significant issue is that the power output, especially in brushless-type configurations, is constrained by the positioning of the motor assembly and driving electronics within the motor section 54. The stator windings and certain circuit components, namely a power module and a diode bridge, generate significant amounts of heat. If not adequately cooled, the associated electronics stop performing, which results in a thermal shutdown of the motor 68. Operation of the cooling fan minimizes this from occurring, but overheating reduces operational performance of the motor assembly. It will also be appreciated that the heat, over time, decreases motor life.

The second significant performance issue is related to the generation of noise. The cooling fan flows air over the electronics, but the fan and inlet vents provide sharp edges which generate noise and most vents are axially disposed in relation to the cooling fan so that the noise permeates outwardly with little to no impediment. Filters and mufflers may be provided, but at an added cost and overall motor size increase. Additionally, the vents do little to prevent contaminants from entering the cooling air intake, especially when the motor is in an off condition.

Other drawbacks of current motor configurations are that the inlet and outlet vents are not easily adapted to modification. For example, if the cooling air is maintained in a dirty environment then filters are required, but the filters reduce the cooling airflow, which may lead to overheating. Special fixtures may also need to be mounted to the airflow inlets and outlets for the cooling air, but these are cumbersome and require construction of unique motor sections. Another drawback is that there are typically issues with contaminants from the cooling airflow entering into the working airflow. Finally, current motor-fan assemblies are not well suited for preventing heat migration from the working fan assembly via the motor shaft to the motor section.

Accordingly, there is a need in the art for a motor-fan assembly with a motor vent cover which has an internal axial inlet and an external radial exit. In particular, there is a need for a motor vent cover which facilitates airflow, reduces noise, and minimizes debris from entering into the cooling fan assembly as is common with prior art assemblies.

SUMMARY OF THE INVENTION

In light of the foregoing, it is a first aspect of the present invention to provide a motor-fan assembly with improved airflow and noise reduction properties.

It is another aspect of the present invention to provide a motor-fan assembly, comprising a motor assembly having a rotatable shaft extending therethrough, a working fan assembly having at least one working fan rotated by the rotatable shaft, a motor cover substantially enclosing the motor assembly, the motor cover having a cover opening extending therethrough, wherein the rotatable shaft extends through the cover opening, a cooling fan assembly having at least one cooling fan rotated by the rotatable shaft, the at least one cooling fan drawing cooling airflow over the motor assembly, and a motor vent cover coupled to the motor cover with the at least one cooling fan therebetween, the motor vent cover having a cooling air outlet through which cooling airflow is exhausted.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 2:
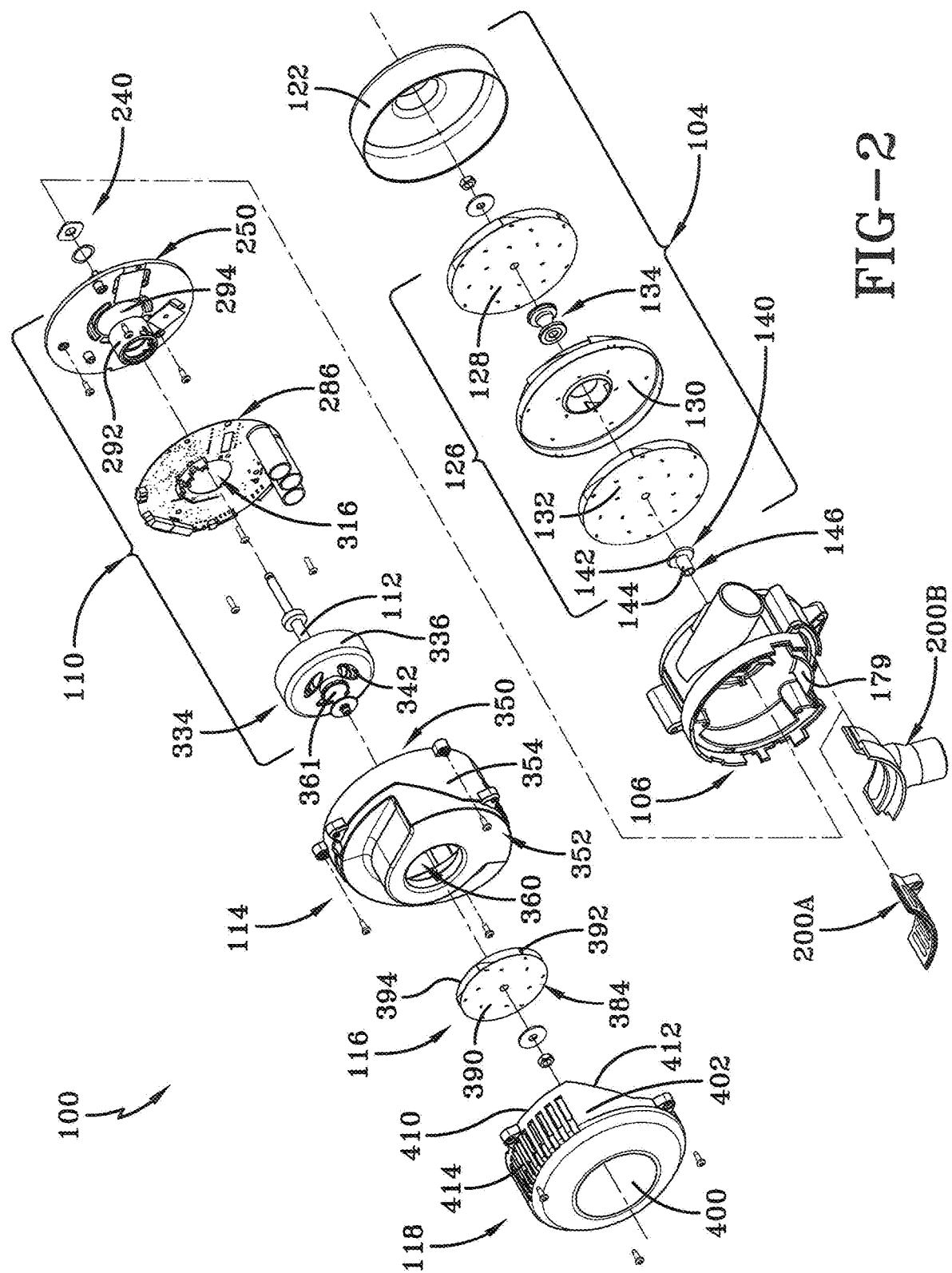
FIG. 2 is an exploded perspective view of a motor-fan assembly made in accordance with the concepts of the present invention.
Figure 3:
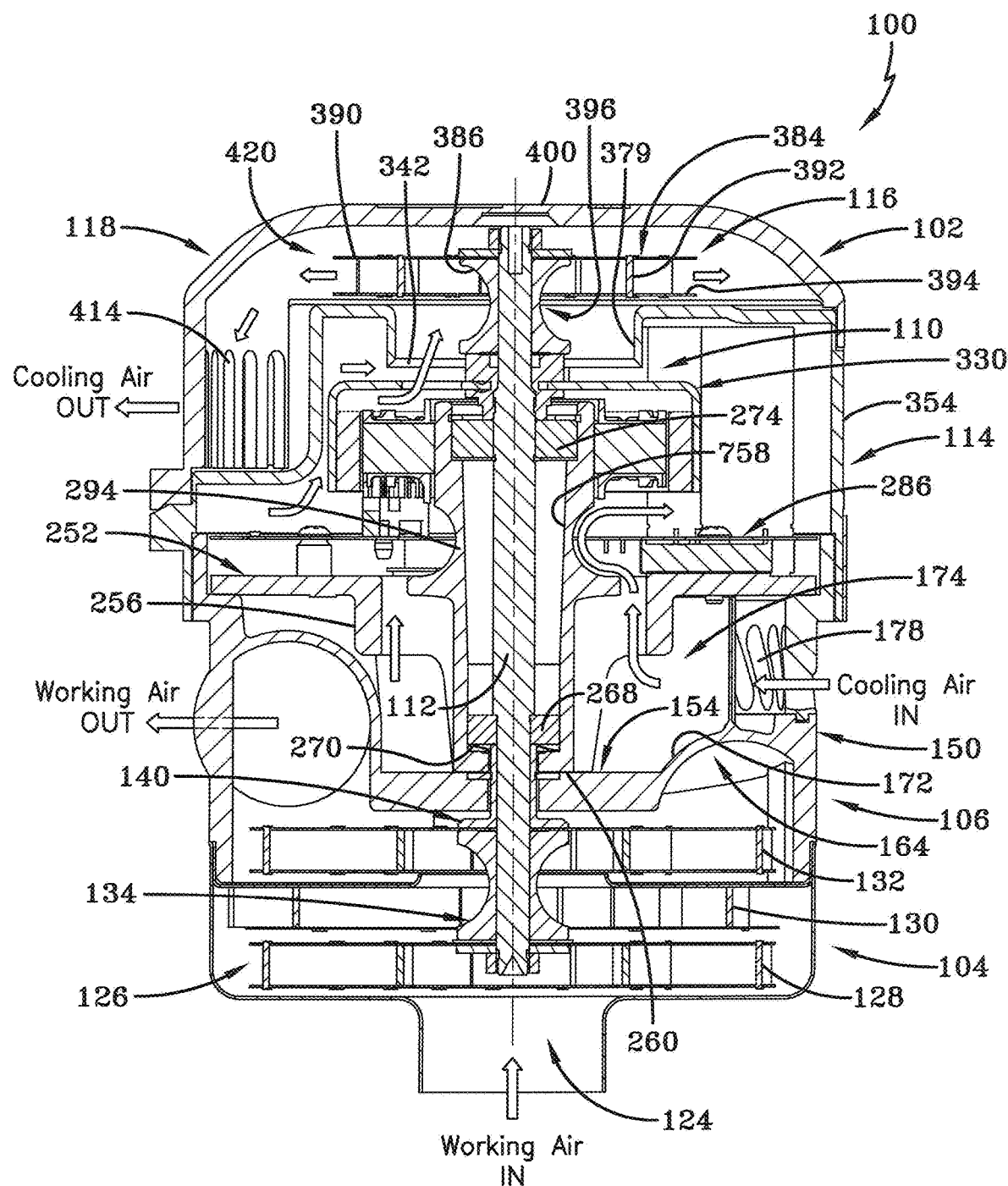
FIG. 3 is a cross-sectional view of the motor-fan assembly made according to the concepts of the present invention.
Figure 4:
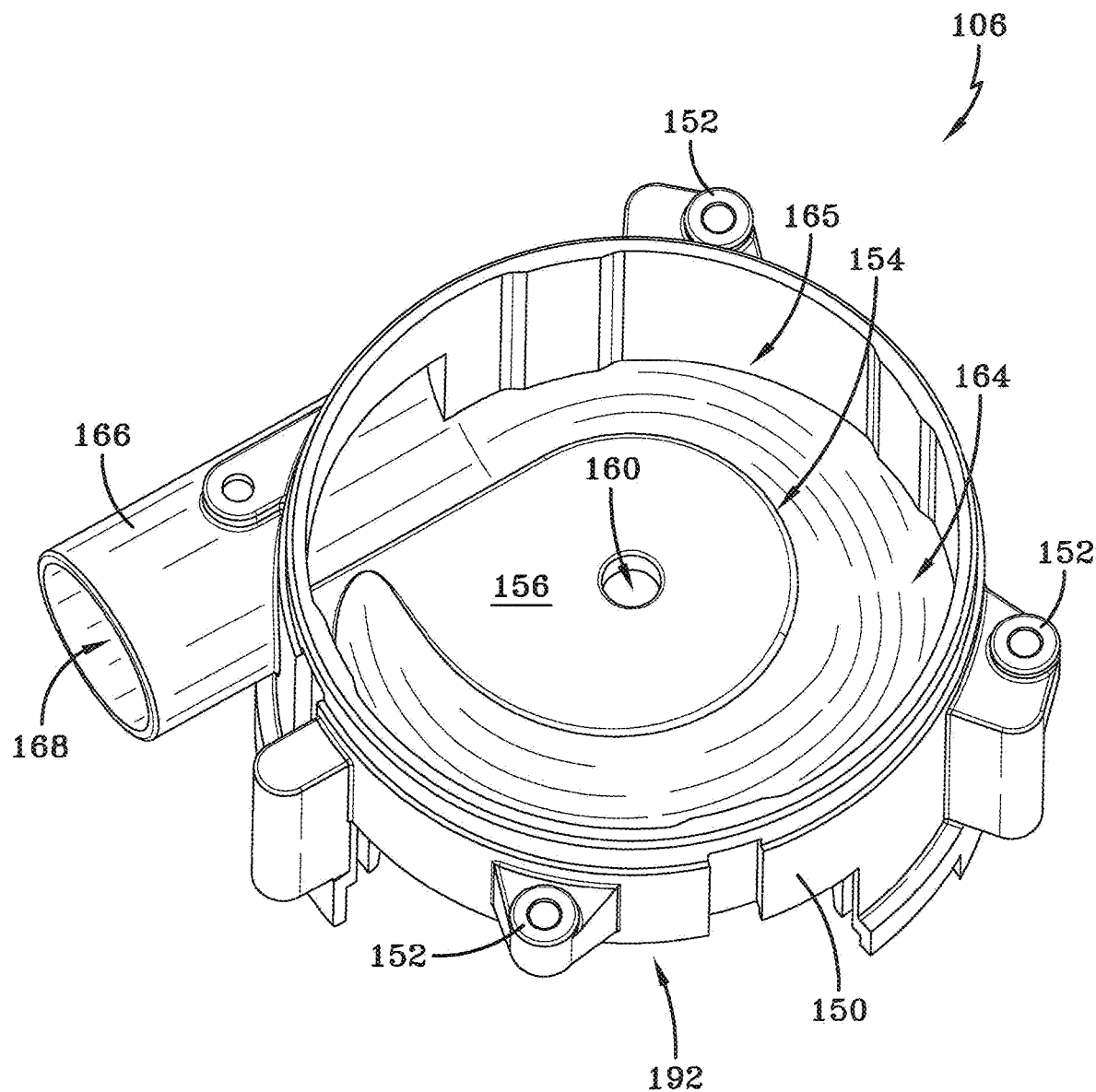
FIG. 4 is a perspective view (working fan side) of a blower housing used in the motor-fan assembly according to the concepts of the present invention.
Figure 5:
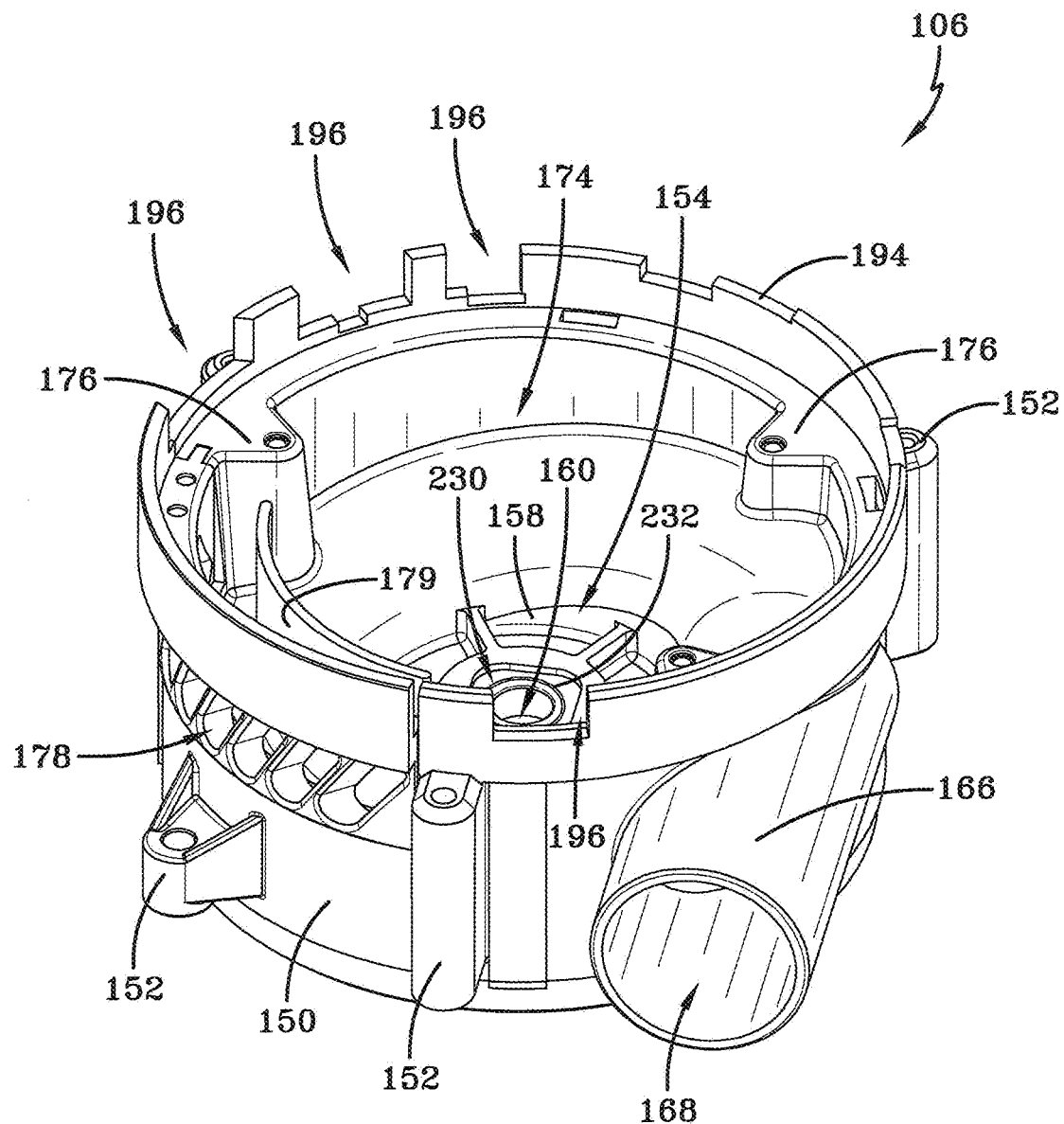
FIG. 5 is a side perspective view of the blower housing showing an installed inlet vent insert in accordance with the concepts of the present invention.

Referring now to FIGS. 2 and 3, it can be seen that a motor-fan assembly according to the present invention is designated generally by the numeral 100. As generally described in the Background Art, a motor-fan assembly generates a working airflow for a particular end use and also a cooling airflow to cool the internal components of the associated motor assembly.

The motor-fan assembly 100 includes an assembly housing 102 which is made up of a number of major component parts that will be generally discussed in an overview of the assembly's operation. Following this general discussion, each of the major components and their component parts will be discussed.

The assembly housing 102 includes a working fan assembly 104 which draws in ambient air, which may or may not be filtered, and exhausts the working air as appropriate. In some applications, the vacuum generated by the working fan assembly is the primary purpose of the motor-fan assembly. In other embodiments, generation of the working air is desirable for a particular end use. In the embodiment shown, the working air is drawn in axially to the working fan assembly and exhausted tangentially from the housing 102. In particular, the working fan assembly 104 includes a blower housing 106, which is also part of the assembly housing, and which may be positioned on one side of the working fan assembly to assist in drawing the working air in and then exhausting the working air out as described above.

A motor assembly 110 is maintained in the assembly housing 102 on the side of the blower housing opposite the working fan assembly and which functions to rotate the working fan assembly 104 for generating the working airflow. The motor assembly 110 includes a rotatable shaft 112 which operates the working fan assembly.

A motor cover 114, which may also be a part of the assembly housing 102, covers the motor assembly 110 on a side opposite the blower housing 106. The motor cover 114 assists in routing the cooling airflow, minimizing motor noise, and assists in keeping contaminants from entering into the motor assembly. A cooling fan assembly 116, which is maintained adjacent the motor cover on a side opposite the motor assembly, is rotated by the rotatable shaft 112 and draws cooling air in from the blower housing 106, wherein the cooling airflow passes through and around the motor assembly 110. A motor vent cover 118, which may also be a part of the assembly housing 102, covers the cooling fan assembly 116 and may be coupled to the motor cover 114 and/or the blower housing 106 so as to provide for an exhaust path for the cooling air generated by the cooling fan assembly 116.

The working fan assembly 104 may be of a standard construction. The assembly 104 includes a fan shell 122 which may be mounted to the blower housing 106 by friction fit, fasteners, or other means. The fan shell may provide an axial opening 124 which may also be referred to as a working air inlet. Contained within the working fan assembly may be a multi-stage fan 126 that operates in a manner known in the art. In the present embodiment, the fan 126 may include a rotating fan 128 secured to an end of the rotatable shaft 112 wherein the fan 128 includes an axial opening aligned with the axial opening 124 which pulls air in and expels the air radially within the fan shell. Next, the expelled radial air is received into a stationary fan 130 which is positioned axially adjacent the rotating fan 128. The stationary fan 130 provides radial vanes which reroute the working air exhausted by the fan 128 to an axial opening that is on a side of the fan 130 opposite the rotating fan 128. Skilled artisans will appreciate that the stationary fan 130 is secured within the fan shell and does not rotate with the shaft 112. Another rotating fan 132 is positioned axially adjacent the stationary fan 130 and axially receives air from the stationary fan through an axial opening. The rotating fan 130 then radially exhausts the working air which then passes out the fan shell 122 via a working air outlet provided by the blower housing 106 as will be discussed. A spool spacer 134 may be secured to the shaft 112 and is employed to position and hold the rotating fans 128 and 132 on the shaft 112 and to allow for positioning of the stationary fan 130 between the rotating fans 128 and 132.

A top hat spacer 140 may be secured to the shaft 112 and provides a slip fit therebetween. In some embodiments, an adhesive may be employed to secure the spacer 140 to the shaft. The spacer 140 extends through and into the blower housing 106 in a manner which will be discussed. The top hat spacer 140 includes a base 142 which may be positioned adjacent a facing surface of the rotating fan 132. A column 144 extends from the base 142 and the spacer 140 has a spacer opening 146 that extends through the column so as to receive the shaft 112.

Referring now generally to FIGS. 2 and 3, and specifically to FIGS. 4-8, it can be seen that the blower housing is designated generally by the numeral 106. The blower housing 106 includes an outer wall 150 which may be generally cylindrically shaped and wherein a plurality of external mounting lugs 152 may extend radially outward from the outer wall 150. The outer wall 150 may be split transversely by a chamber wall 154. In the present embodiment, the chamber wall 154 includes a working fan side 156 which faces the working fan assembly 104 and a motor side 158 which faces the motor assembly 110. The chamber wall 154 includes a spacer/shaft opening 160 which extends from one side to the other and receives the top hat spacer 140 and, in particular, the column 144, wherein the rotatable shaft 112 is received in the spacer opening 146. The top hat spacer and the received motor shaft 112 rotate within the spacer/shaft opening 160 in a manner that will be discussed.

The working fan side 156 may provide a volute 164 which gradually expands from an outer radial periphery of the blower housing toward a port 166 which extends tangentially from an exterior of the outer wall 150. Together, the fan shell 122, the working fan side 156 of the chamber wall 154, and the outer wall 150 form a working fan chamber 165 which receives the multi-stage fan 126. Generally, the multi-stage fan 126 draws working air into the chamber 165, pressurizes the working air and propels the airflow toward the port 166. The port 166 provides for a port opening 168 from which the working air is exhausted. As the working fan assembly 104, and in particular the rotating fans 128 and 132 are rotated by the shaft, an airflow is drawn in through the axial opening 124 and the airflow generated by the rotating fan 132 is expelled into the volute 164. The volute generally expands which allows for a corresponding expansion of the airflow until exiting the port opening 168.

The motor side 158, which is formed by the outer wall 150 and the chamber wall 154, provides a volute wall 172 which extends from the chamber wall and is the other side of the volute 164 provided on the working fan side 156. Together the volute wall 172, the chamber wall 154, and the interior surface of the adjacent wall 150 form a blower housing chamber 174. The outer wall 150 provides for internally extending mounting lugs 176 which may provide for connection points to other components within the motor-fan assembly such as the motor assembly 110 as will be described. The motor side 158 of the blower housing 106 and in particular the outer wall 150 may provide for a cooling air inlet 178 which allows for entry of cooling airflow into the assembly housing 102. As will be discussed in more detail, the cooling fan assembly draws cooling air in through the inlet 178 which is then routed internally through the assembly housing and out the motor vent cover 118. In some embodiments, a deflector wall 179 may extend substantially perpendicularly from the motor side 158 of the chamber wall 154 in a position radially offset from the inlet 178. The deflector wall 179 may serve to re-direct the incoming airflow within the blower housing chamber 174 and/or to reduce or muffle the amount of sound emanating from the motor assembly. The wall may be substantially concentric with the inlet 178 and the outer wall 150 or the deflector may be skewed in relation to the outer wall 150 to obtain a desired noise reduction or airflow within the chamber 174.

Figure 1:
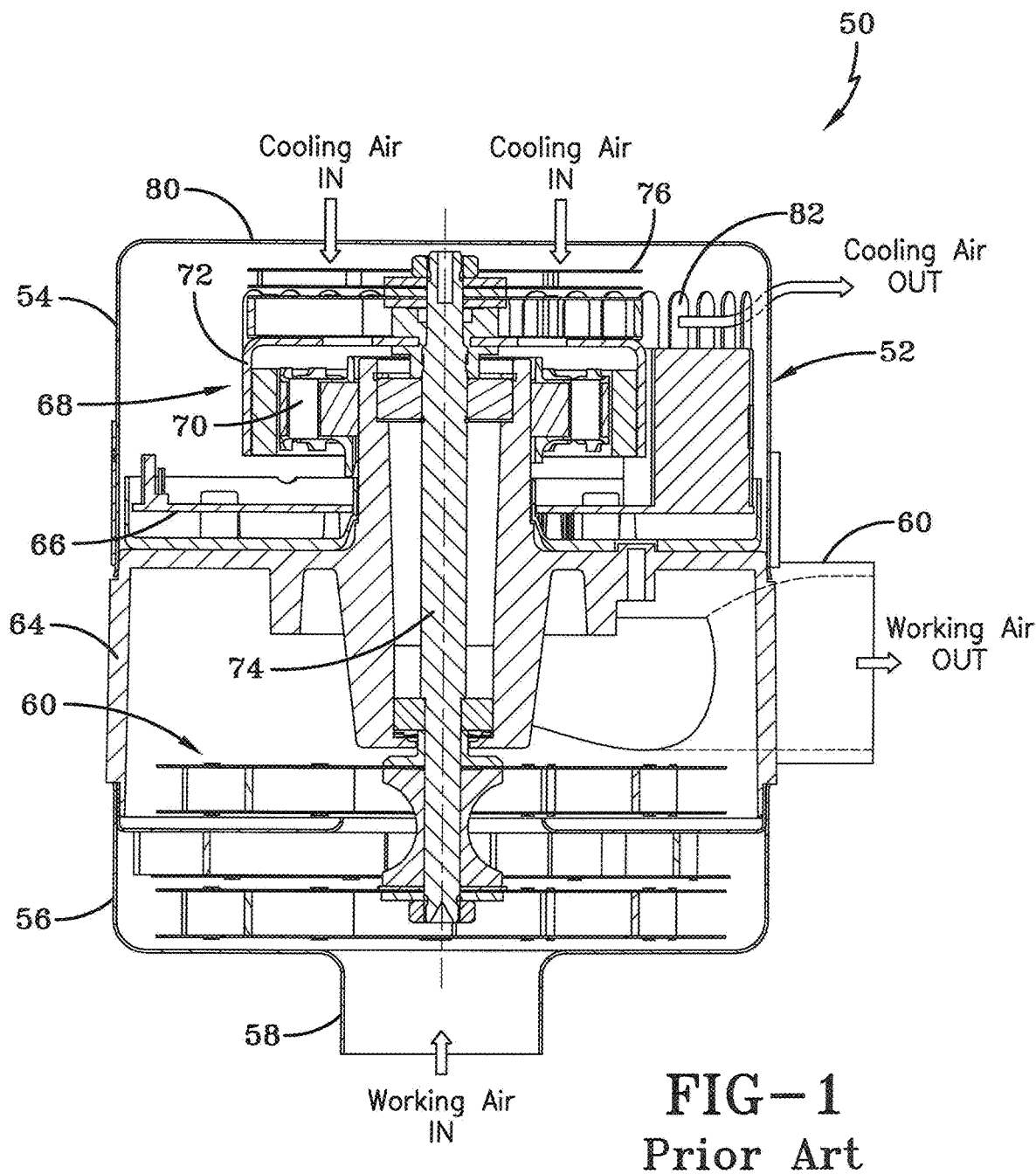
FIG. 1 is a cross-sectional view of a prior art motor-fan assembly.

In the present embodiment, the chamber wall 154 functions to separate the working fan assembly 104 from the remainder of the motor-fan assembly 100. Referring back to FIG. 1, it will be appreciated that the prior art fan section 56 was positioned immediately adjacent the motor section 54. As a result, heat generated by the working fan assembly migrated along the rotatable shaft toward and into the motor assembly 110. In the present embodiment, the chamber wall 154 isolates the working fan assembly from the remainder of the motor-fan assembly 110 including the bearings associated therewith.

In some embodiments, the inlet 178 may simply be appropriately sized openings in the outer wall 150. However, in the present embodiment the inlet 178 may be formed with replaceable inserts that allow the end-user to modify the motor-fan assembly in such a way as dictated by a particular end-use of the assembly and concerns as to whether the cooling air can be drawn from the surrounding ambient air or from a source of air that does not contain contaminants that might otherwise be found in the ambient air. In one embodiment, the blower housing 106 and, in particular the outer wall 150 on the motor side 158, provides for an insert frame 180 which extends almost 90° along the arcuate length of the wall 150. The frame 180 includes a frame bottom edge 182 along the outer wall 150. The edge 182 may provide for a step wall 183 that perpendicularly extends from the frame bottom edge 182 and from which perpendicularly extends an insert step 184 which is aligned along the frame bottom edge 182. In some embodiments, an edge groove 185 may be formed between an exterior surface of the outer wall and the step wall 183. Extending substantially perpendicularly from each end of the frame bottom edge 182 are a pair of opposed insert tracks 186. Formed between each of the tracks 186 is a track groove 190. Accordingly, the insert frame 180 and, in particular the edge 182 and the tracks 186, form an insert opening designated generally by the numeral 192.

The wall 150, on the motor side 158, provides an outer wall edge 194. At selected locations along the outer wall edge are a number of connector notches 196. When the motor assembly is assembled to the blower housing 106, the notches 196 are enclosed to provide selective access to switches and connectors associated with the motor assembly.

Figure 6:
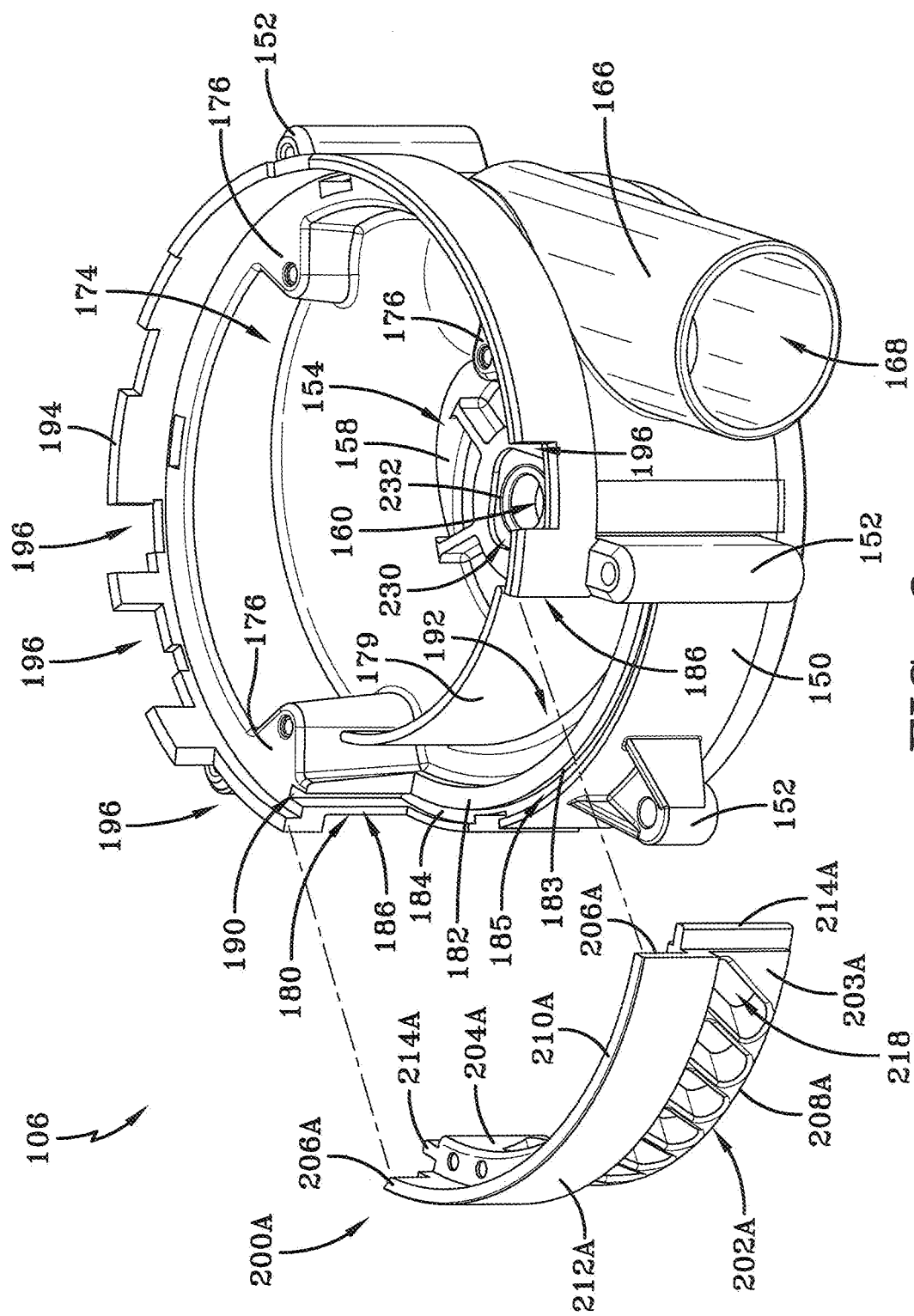
FIG. 6 is a different side perspective view of the blower housing with the inlet vent insert shown exploded away from the blower housing according to the concepts of the present invention.
Figure 7:
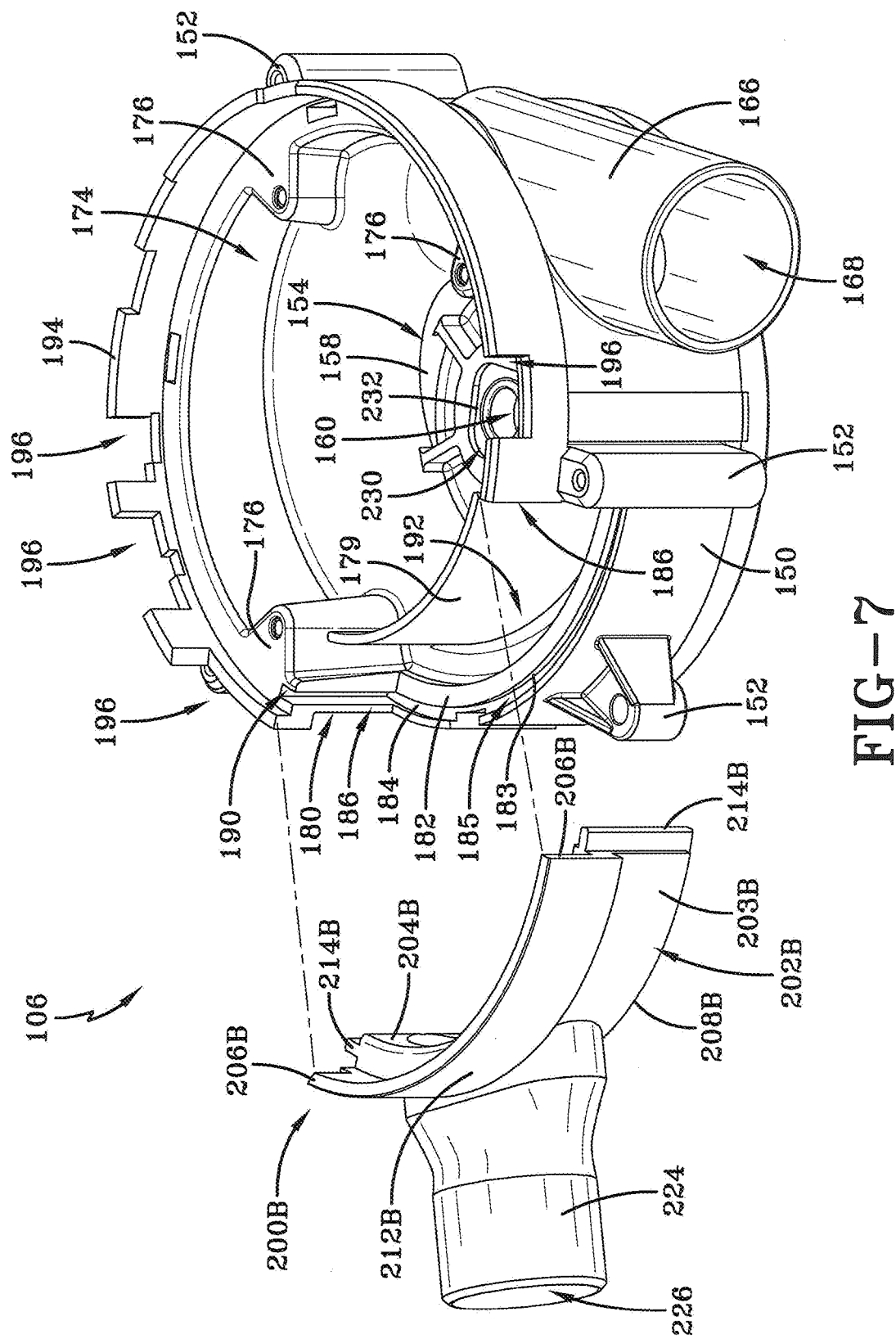
FIG. 7 is a perspective view of the blower housing with an inlet tube insert shown exploded away from the blower housing in accordance with the concepts of the present invention.

The insert opening 192 may receive an inlet insert 200 that forms the cooling air inlet 178. In one embodiment the inlet insert may be an inlet vent insert 200A (FIG. 6) and in another embodiment the inlet insert may be an inlet tube insert 200B (FIG. 7). A vent insert 200A allows for the entry of cooling air into the assembly housing 102, as does the inlet tube insert 200B. The inserts 200 may be of a generally arc shaped construction so as to be aligned with the cylindrical shape of the outer wall of the blower housing 106. When the inlet tube insert 200B is employed, a connection port is provided so that a tube or other hose-like configuration may be secured to the tube insert, wherein the opposite end of the connected tube has an inlet that is positioned away from the motor-fan assembly 100. This allows for air from a clean or non-dirty source or filter attachment to be directed through the motor-fan assembly if desired.

The inlet vent insert 200A includes an arcuate body 202A with an outer facing surface 203A. Opposite the outer facing surface 203A is an inner facing surface 204A. The body provides for opposed side edges 206A that are connected by a bottom edge 208A. A top edge 210A connects the side edges 206A on the side opposite the bottom edge 208A. An insert wall extension 212A extends from the body 202A and is of the same arc shape as the body 202A. Extending from each side edge 206A is an insert rail 214A. The body 202A also provides a number of openings 218 extending therethrough which may be slanted or otherwise configured. As best seen in FIGS. 6 and 7, the insert rails 214A are receivable in the corresponding track grooves 190. As a result, the inlet vent insert 200A may be installed and removed as needed for a particular end use.

In place of the inlet vent insert 200A, the inlet tube insert 200B may be installed. The inlet tube insert 200B is constructed in a manner similar to the insert 200A, except that the vent openings 218 are replaced with a tube 224 extending from the outer facing surface 203B. Otherwise, the components of the insert 200B that are common with the insert 200A are provided with the same identifying number, but a corresponding suffix. In any event, the tube 224 forms a tube opening 226 which serves as a connection point for a tube, hose, or filter media that provides clean cooling air to the motor-fan assembly as discussed above.

Both inserts may be held in place when the motor mount bracket 250 is secured to the blower housing 106. The motor cover may also provide a bottom edge that further exerts a sealing force on the respective insert.

Figure 8:
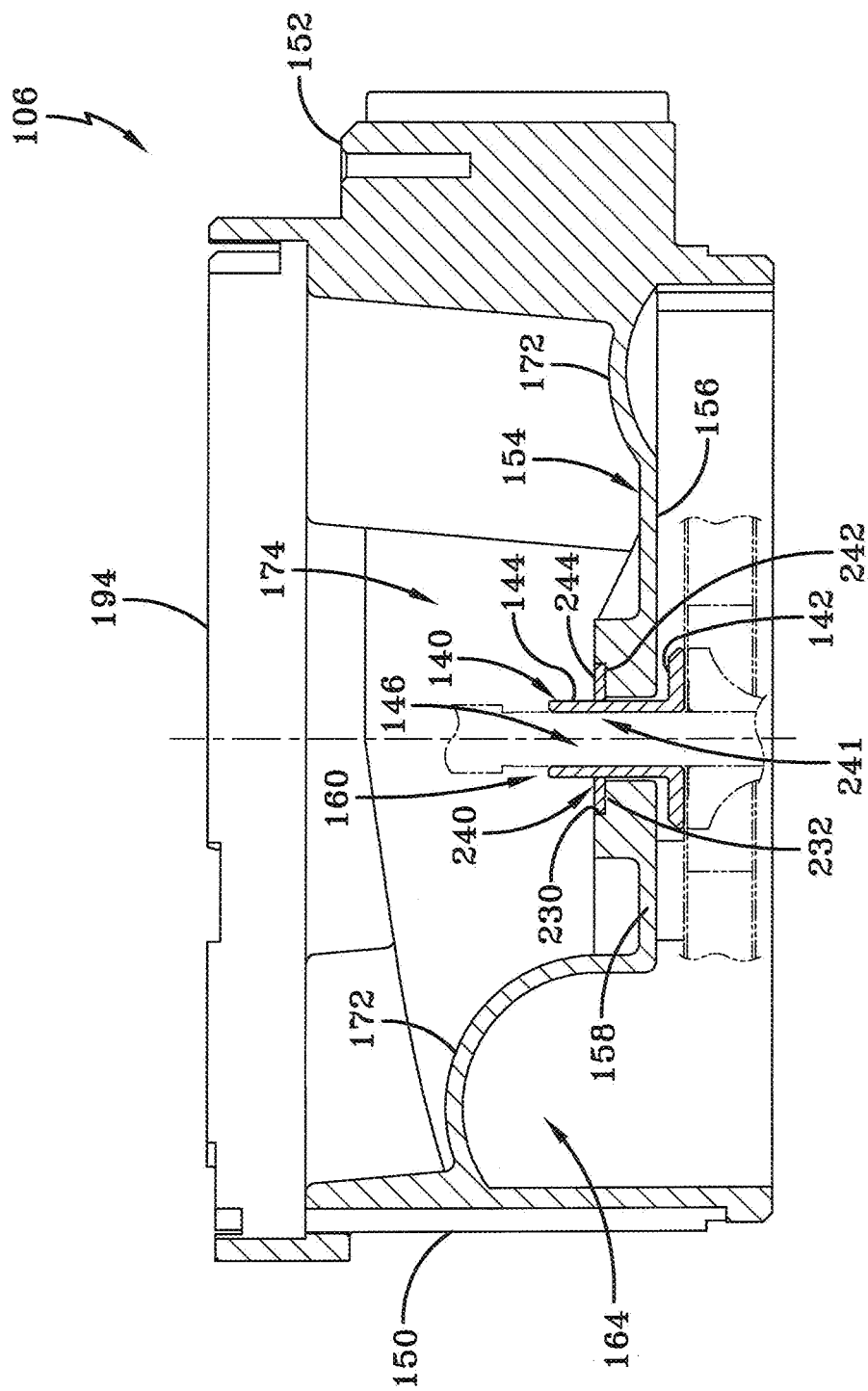
FIG. 8 is a cross-sectional view of the blower housing according to the concepts of the present invention.
Figure 9:
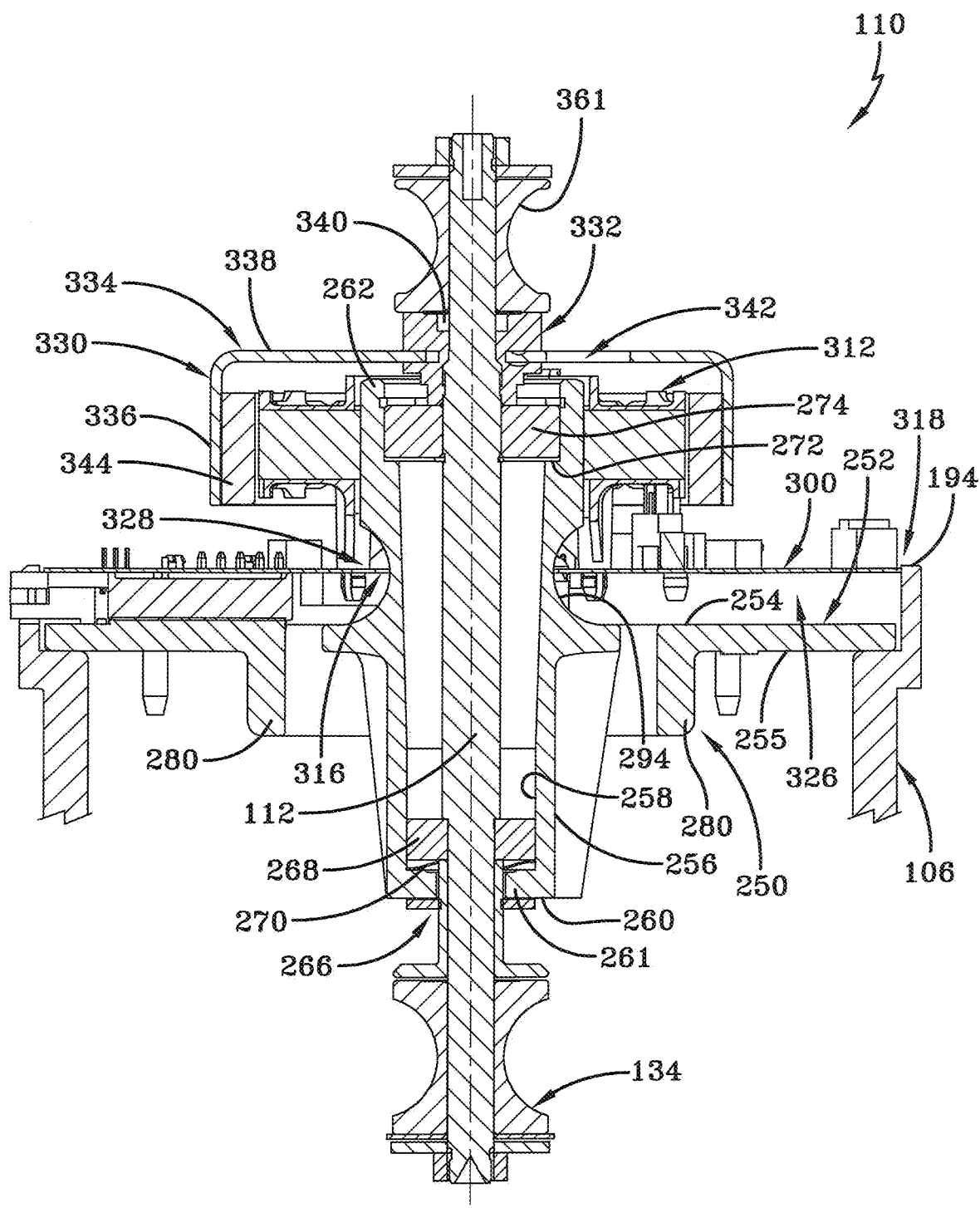
FIG. 9 is a cross-sectional view of a motor assembly used in the motor-fan assembly made in accordance with the concepts of the present invention.
Figure 10A:
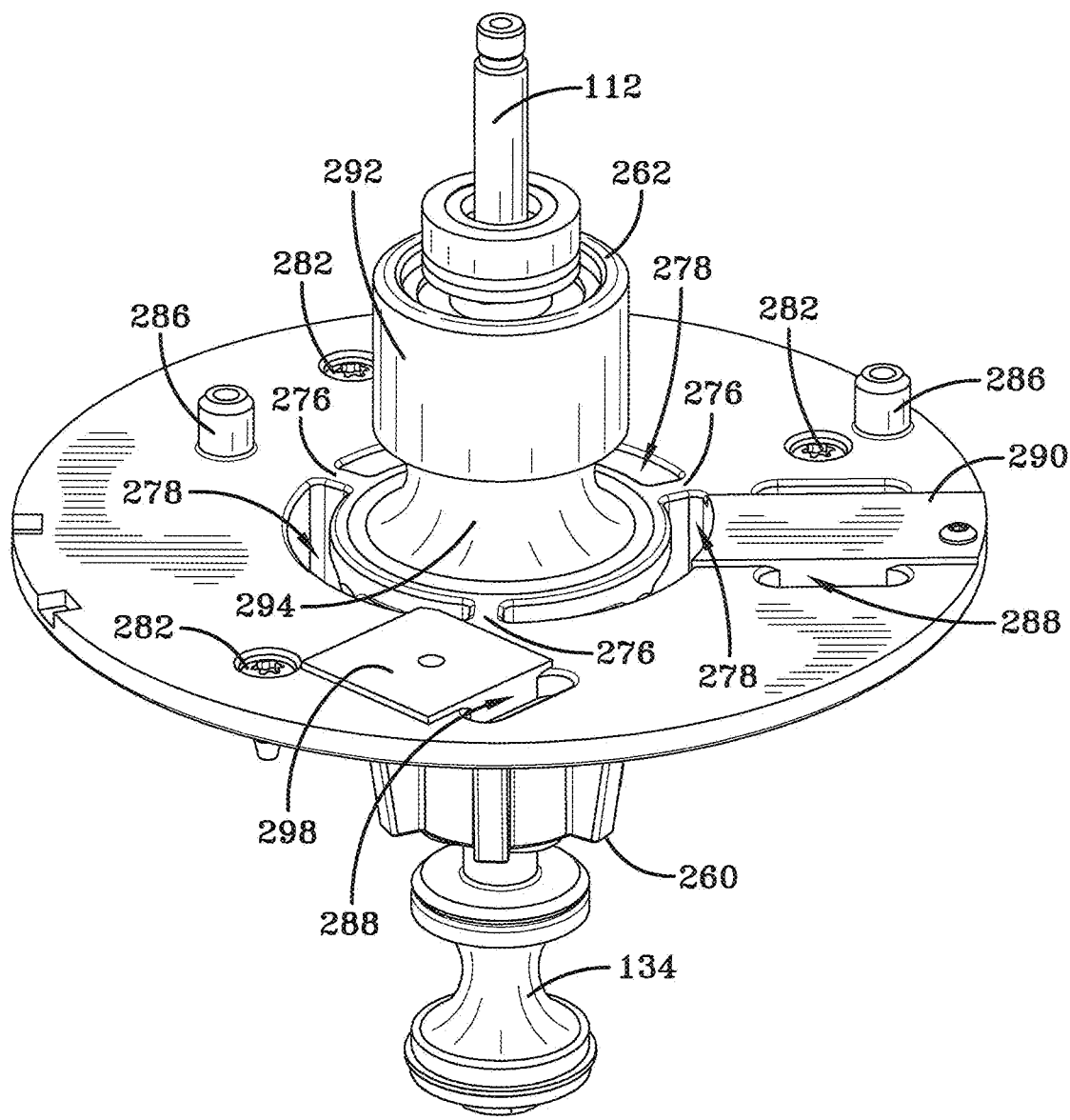
FIGS. 10A and 10B are respective top and bottom perspective views of a motor mount bracket used in the motor-fan assembly in accordance with the concepts of the present invention.
Figure 10B:
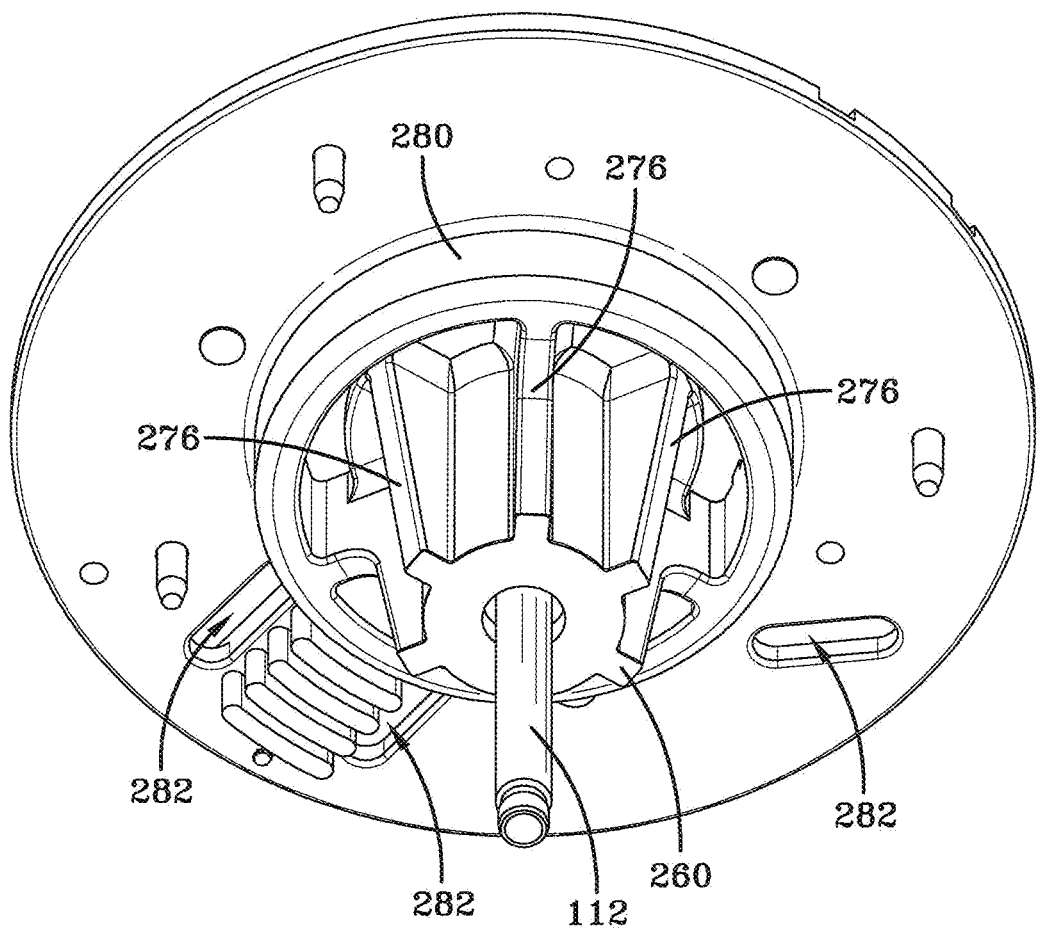

As best seen in FIGS. 5-8, the chamber wall 154 on the motor side 158 provides for a seal pocket designated generally by the numeral 230 which surrounds the shaft opening 160. In the embodiment shown, the seal pocket 230 may be a non-circular shape although a circular shape may be employed if desired. Concentric around the shaft opening 160 and within the seal pocket is at least one concentric rib 232. As best seen in FIG. 8, the top hat column 144 extends through the shaft opening 160 and a seal 240, which may be made of an adhesive backed PTFE® (polytetrafluoroethylene), sold under the trademark GORE-TEX® manufactured by W.L. Gore & Associates, is placed and adhesively or frictionally held in the seal pocket 230. In another embodiment, the seal 240 may be provided with non-circular or straight sides that are shaped similar to the seal pocket 230. Or, the seal may be provided with straight sides wherein the pocket is circular in shape. In any event, it is desired that the seal and the seal pocket be configured so as to prevent rotation of the seal as the shaft rotates. Preventing rotation is also assisted by the concentric rib 232 which also assists in compressing the seal to prevent moisture migration. The seal 240 includes a seal opening 241 which is aligned with the shaft opening 160. The seal also provides for a chamber side 242 which faces the seal pocket 230 and a motor bracket side 244 which faces outwardly into the blower housing chamber 174. Operation of the seal 240 will be provided after a discussion of the motor assembly.

Referring now to FIGS. 2 and 3 and 9-12, it can be seen that the motor assembly is designated generally by the numeral 110. The motor assembly rotates the shaft 112 which rotates the fans in the working fan assembly 104 and the fan in the cooling fan assembly 116. The motor assembly may include a motor mounting bracket 250. The bracket 250 may include a mounting plate 252 which includes a circuit board side 254 which generally faces the motor cover 114 and the motor vent cover 118, and a blower housing side 255 which generally faces the blower housing 106. The plate 252 is generally disc-shaped and in some embodiments is made of aluminum, or other material which functions as a heat sink. Extending from both sides of the mounting plate 252 is a tubular core 256 wherein the entire length of the core rotatably receives the rotatable shaft 112. The core 256 includes an inner core wall 258 which is generally concentric with the rotatable shaft. The tubular core provides a blower end 260 which is received in the blower housing chamber 174. The tubular core also provides a motor end 262 opposite the blower end 260. The blower end 260 is positioned and supported by the seal pocket 230 and, in particular the motor bracket side 244 of the seal 240. The blower end 260 provides an inward extension 261 of the inner core wall 258, which forms a blower end hole 266 that receives the top hat spacer column 144. Indeed, the column 144 of the top hat spacer 140 extends into the blower end hole 266. Moreover, the blower end 260 is positioned adjacent the seal 240 and, in particular, the chamber side 242 of the seal 240. When the motor assembly 110 is assembled to the blower housing 106, a compressive force is directed through the mounting plate 252 and the tubular core 256 so as to exert a compressive force on the seal 240 which may have a smaller diameter opening than the diameter of the column 144. Accordingly, as the shaft 112 and the spacer 140 rotate, a seal is formed between the inner diameter of the seal 240 and the outer diameter of the column 144.

A bearing 268 is received between the inner core wall 258 and the shaft 112 near the inward extension 261 that forms the blower end hole 266. A bearing spacer 270 may be interposed between the bearing 268 and the inward extension 261 of the inner core wall 258 which forms the blower end hole 266. In some embodiments, a top edge of the column 144 may support an inner race of the bearing 268. At the opposite end of the blower end hole 266, at the motor end 262, is an inner core step 272 which extends inwardly from the inner core wall 258. A bearing 274 has an inner race secured to the shaft and an outer race received on and supported by the inner core step 272 so as to provide rotatable support between the shaft 112 and the inner core wall 258. As will be appreciated by skilled artisans, the spacer 270 may be a wave spacer which takes any end play out of the balls in the bearings when compressed. When the fan assemblies 104 and 116 are assembled to the shaft 112, the top hat spacer 140 is captured between an inner race of the earing 268 and the spool spacer 134.

The mounting plate 252 is connected to the tubular core 256 at about a midpoint thereof by a plurality of connecting ribs 276. The connecting ribs form a plurality of mounting plate vents 278 between the plate 252 and the core 256 which are concentric around the tubular core 256. The mounting plate 252 may also provide for mounting plate flanges 280 which extend from the blower housing side 255 and which mateingly fit into the blower housing 106. The mounting plate 252 may also provide fastener openings 282 which extend therethrough and which are aligned with the internal mounting lugs 176. Fasteners are received through the fastener openings 282 so as to secure the motor mounting bracket 250 to the blower housing which, in turn, results in the blower end 260 exerting a compressive force on the seal 240.

Extending from the mounting plate 252 and in particular the circuit board side 254, are a plurality of circuit board stand offs 286. Additionally, the mounting plate 252 provides for a plurality of plate vents 288 that extend therethrough and which may be strategically placed in relation to the other features of the motor assembly. Heatsinks 290 may extend from the circuit board side 254 and, in some embodiments, a selected number of the vents 288 may be positioned along one or more sides of the heatsink 290. Extending axially from the tubular core 256 is a bearing holder 292 which receives the previously discussed bearing 274 which is supported by the inner core step 272. In some embodiments, an outer facing surface of the tubular core 256 may have a scallop 294 which is an inwardly curved portion positioned between the bearing holder 292 and the connecting ribs 276. The scallop 294 extends around the outer periphery of the tubular core and, as will be discussed in further detail below, assists in the cooling airflow passing through the motor-fan assembly 100 and, in particular, the motor assembly 110.

Figure 11A:
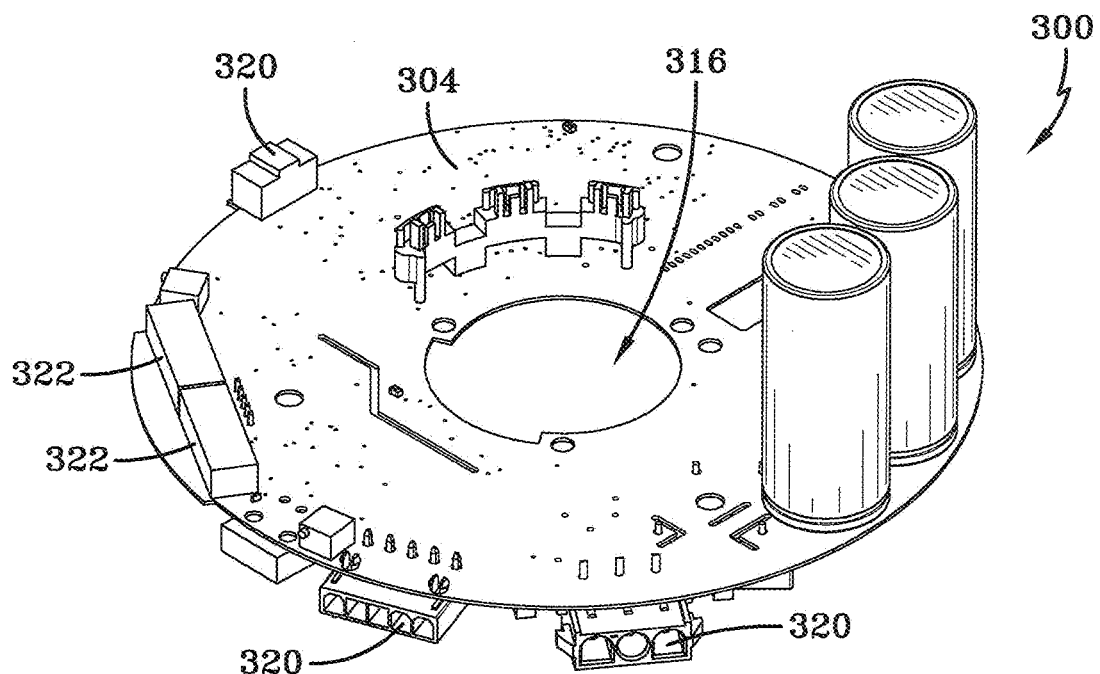
FIGS. 11A and 11B are respective top and bottom perspective views of a circuit board incorporated into the motor-fan assembly in accordance with the concepts of the present invention.
Figure 11B:
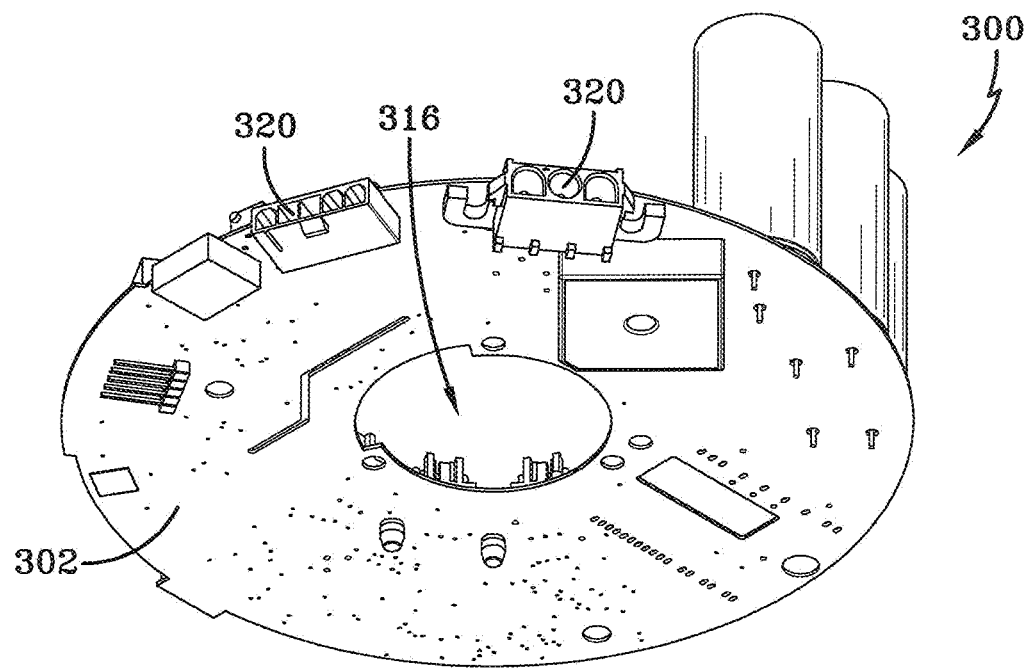
Figure 12:
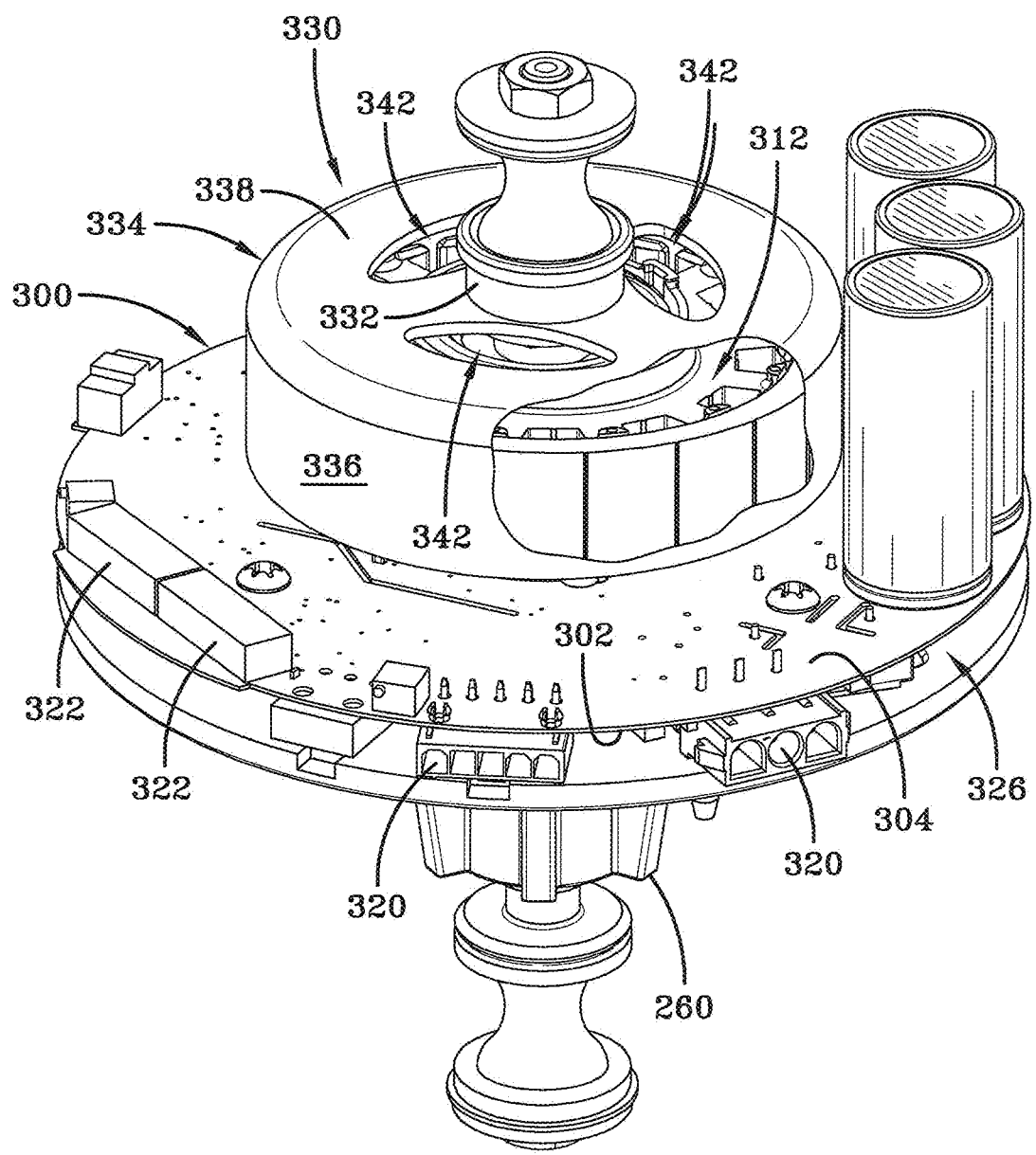
FIG. 12 is a top perspective view of the circuit board, a stator assembly, and a rotor assembly assembled to the motor mount bracket according to the concepts of the present invention.
Figure 13:
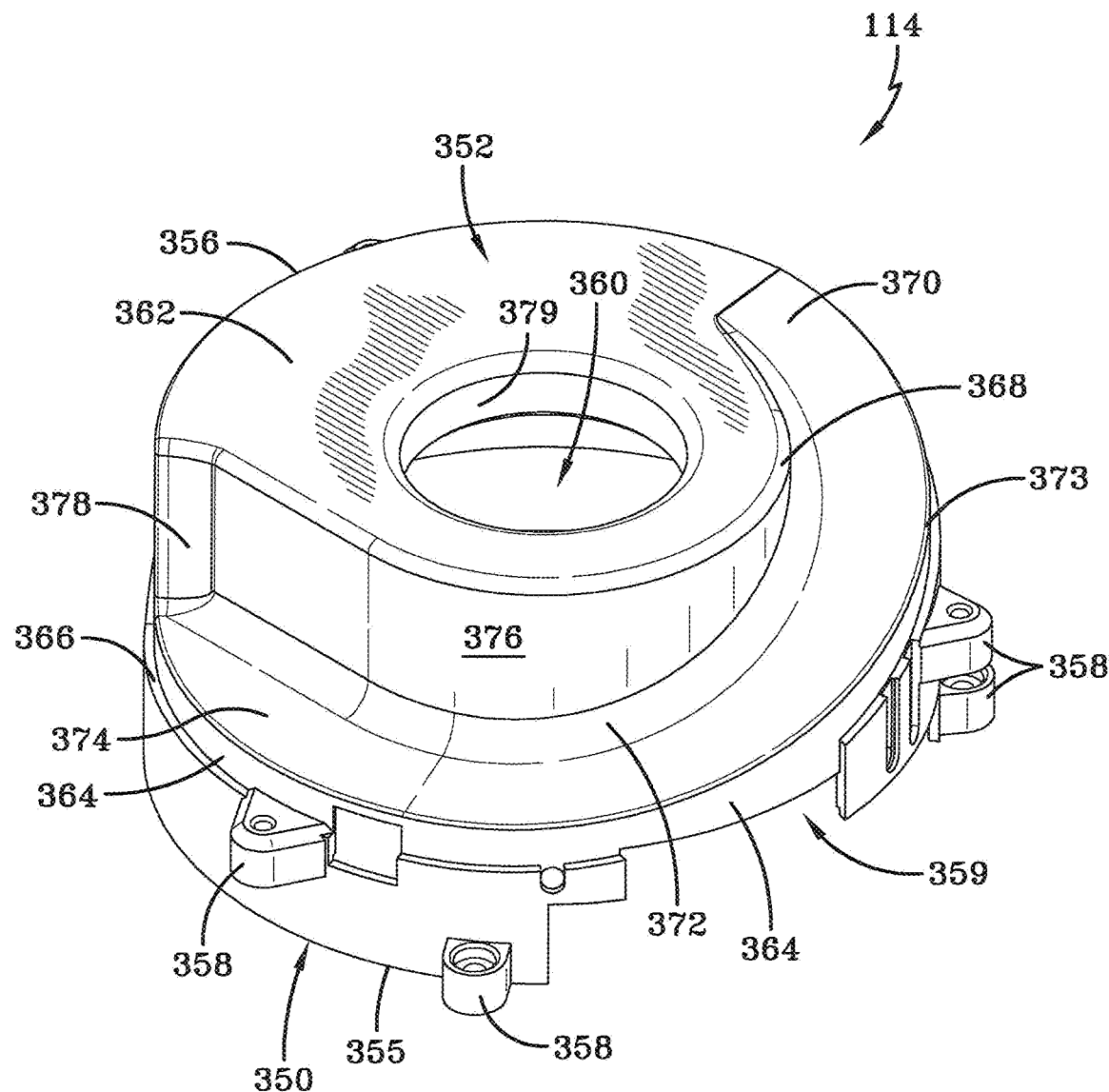
FIG. 13 is a top perspective view of a motor cover utilized in the motor-fan assembly according to the concepts of the present invention.
Figure 14:
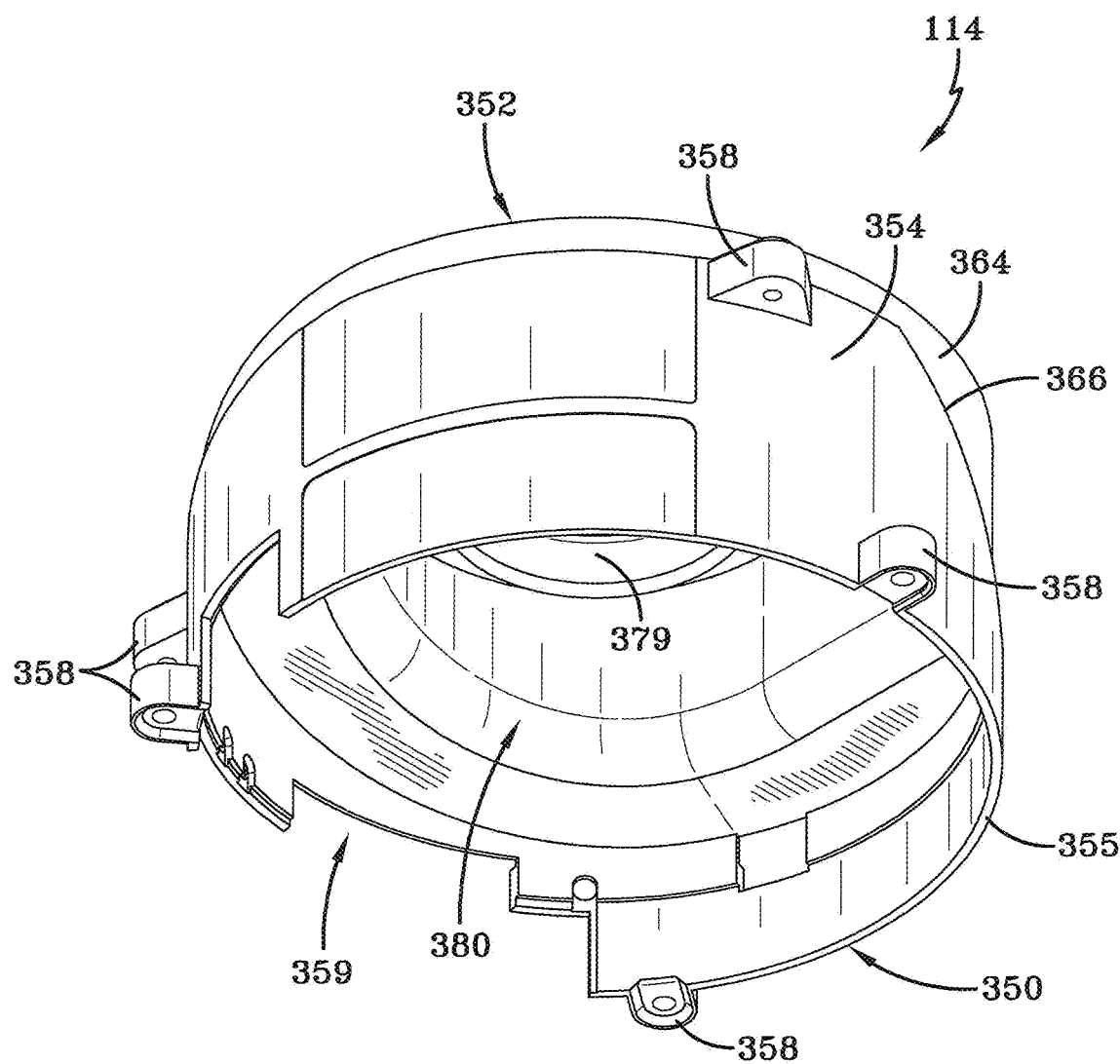
FIG. 14 is a bottom perspective view of the motor cover according to the concepts of the present invention.
Figure 15:
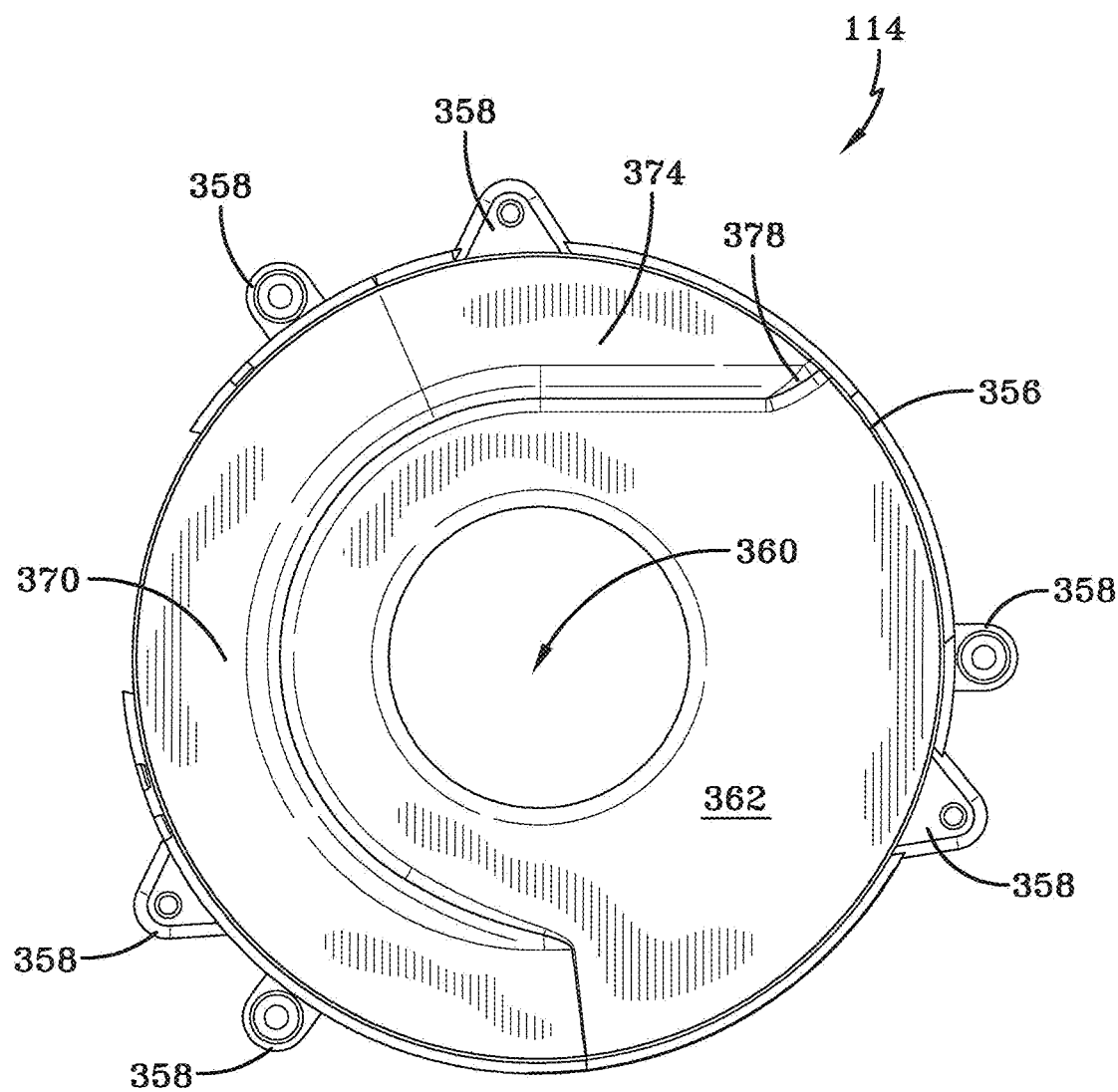
FIG. 15 is a top view of the motor cover according to the concepts of the present invention.

A circuit board 300, best seen in FIGS. 11A and 11B, which is part of the motor assembly 110, includes a mount plate side 302 and a cooling fan side 304. The mount plate side 302 is placed on to the circuit board stand offs 286 and secured thereto by appropriate fasteners. The mount plate side 302 may include a diode bridge, which may be positioned in proximity to the heatsink 290, and a power module which may be positioned near the plate vents 288. Other significant heat sources may be placed on the mount plate side 302. Extending from the cooling fan side 304 is a stator assembly 312 which has an opening therethrough that aligns with a board opening 316 that extends through the circuit board which also receives the bearing holder 292. The circuit board 300 also provides for a number of connectors 320 so as to receive diagnostic information and/or power. The circuit board also provides a number of DIP switches 322 which allow for adjustments to the operation of the electronics on the circuit board and, as a result, the motor assembly.

Referring back to FIG. 9, positioning of the circuit board 300 on the mounting plate 252 provides for an airflow gap 326 therebetween. The scallop 294 may be aligned with the airflow gap 326 so that cooling airflow passing through the vents 278 and 288 may pass underneath the circuit board and under the stator assembly and other slight openings between the circuit board, the connectors, the mounting plate, and the blower housing. Indeed, the outer wall edge 194 and an outer edge of the circuit board 300 may form a peripheral gap 318 that allows cooling airflow therethrough. The inner edge of the circuit board which forms the board opening 316 may be positioned in a void formed by the scallop 294 so as to form a scallop-board gap 328 that is contiguous with the airflow gap 326 to also allow cooling airflow.

A rotor assembly 330 is secured to an end of the shaft 112 opposite the working fan assembly. The assembly 330 includes a retaining ring 332 which is secured to the shaft wherein one end of the retaining ring is adjacent an inner race of the bearing 274. The rotor assembly 330 further includes a rotor cup 334 which is secured to the retaining ring 332. In the present embodiment, the ring 332 is formed in an injection molding process that utilizes molten zinc material or a zinc-based alloy which secures the rotor cup 334 to the shaft 112. In other embodiments, a spacer and fasteners may be employed to hold the cup adjacent the shaft. The rotor cup includes a cup wall 336 which perpendicularly extends from a cup face 338. The cup face 338 includes a central hole 340 which receives the retaining ring 332 and received shaft 112 therethrough. The face 338 also provides for a plurality of face vents 342 which are openings that extend through the cup face and allow for airflow therethrough. As is commonly understood, a plurality of motor magnets 344 are secured inside the cup wall 336 and face the stator assembly 312. The retaining ring 332 is adjacent the inner race of the bearing in the bearing holder 292. In view of the molded connection provided by the rind 332, the cup 334 rotates with the shaft 112.

Referring now to FIGS. 2, 3, and 13-16, it can be seen that the motor cover is designated generally by the numeral 114. The cover 114 is secured to the blower housing 106 by fasteners or the like and generally covers the motor assembly 110 and its components. The motor cover provides for a motor assembly side 350 which faces the motor assembly opposite a cooling fan side 352. The motor cover 114 includes a cover wall 354 which is generally cylindrically shaped. The cover wall 354 includes a blower edge 355 that is positioned adjacent the blower housing 106. Opposite the blower edge 355 is a platform edge 356.

Figure 16:
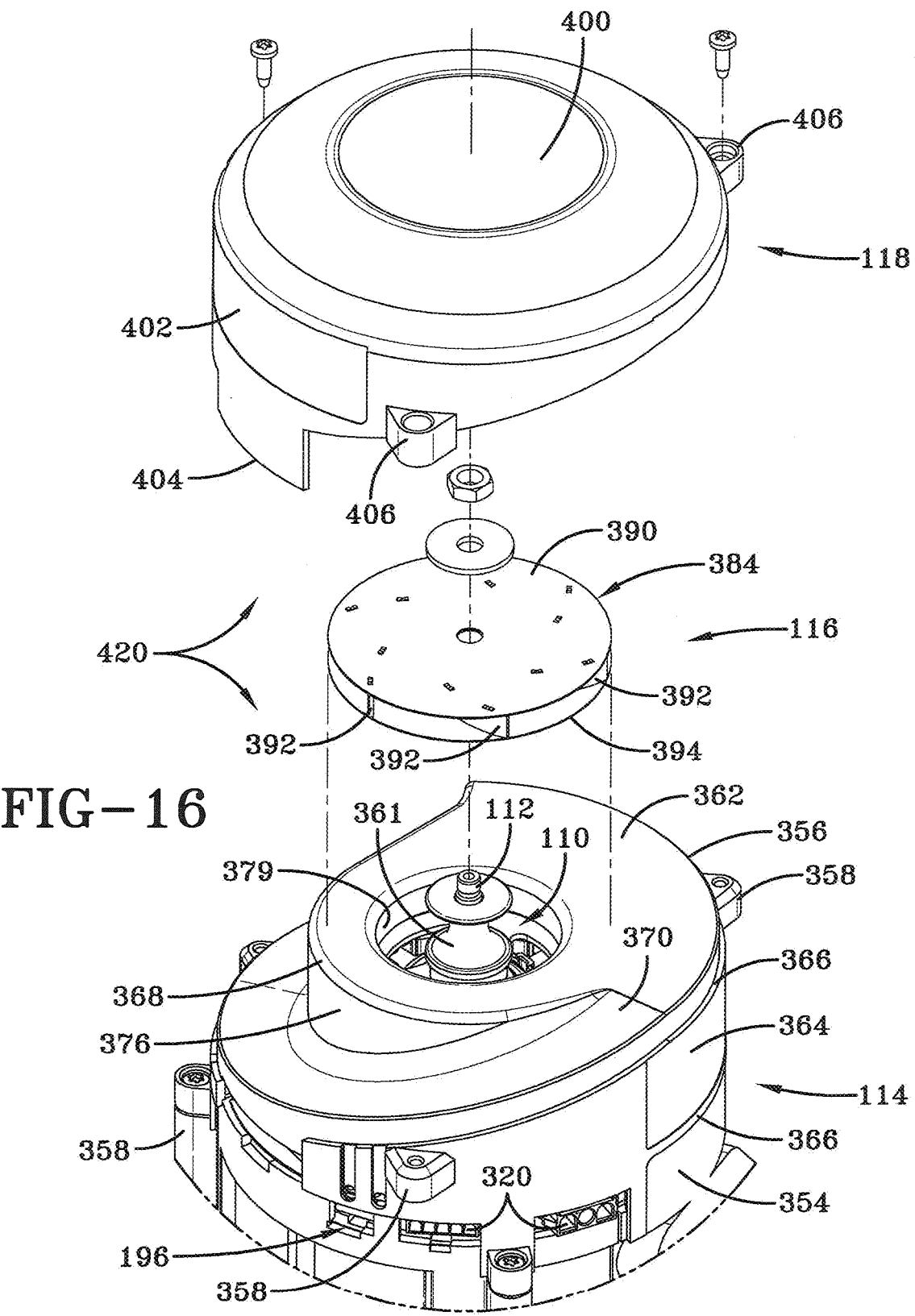
FIG. 16 is a partial exploded perspective view showing a motor vent cover, a cooling fan assembly, and the motor cover according to the concepts of the present invention.
Figure 17:
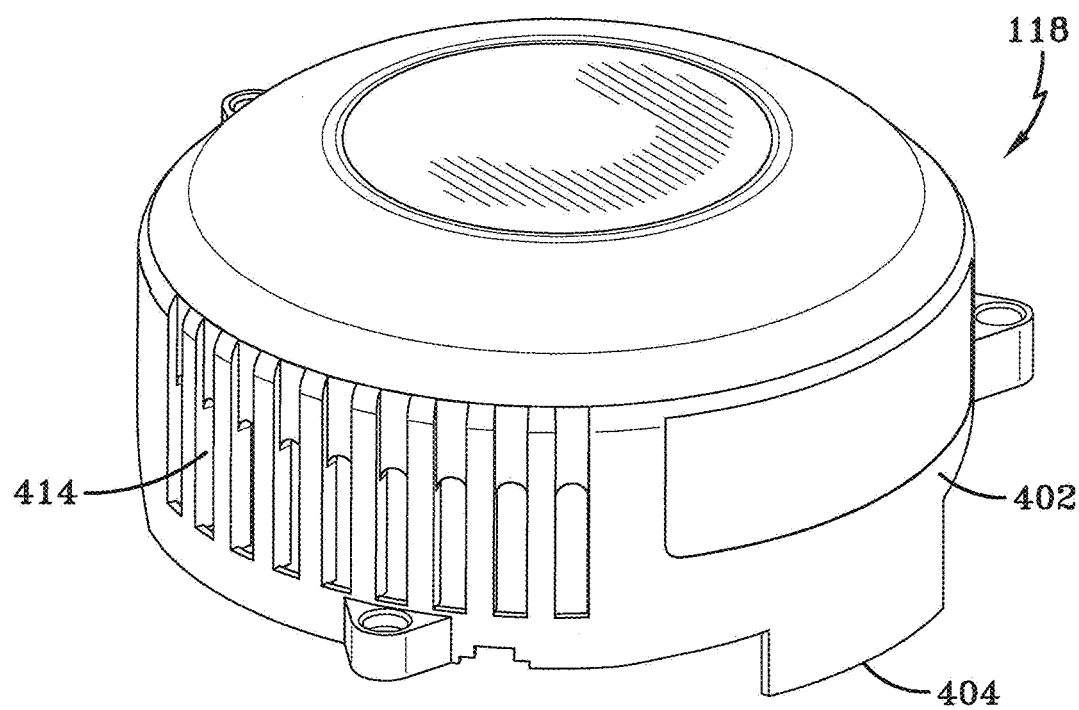
FIG. 17 is a top perspective view of the motor vent cover utilized in the motor-fan assembly according to the concepts of the present invention.
Figure 18:
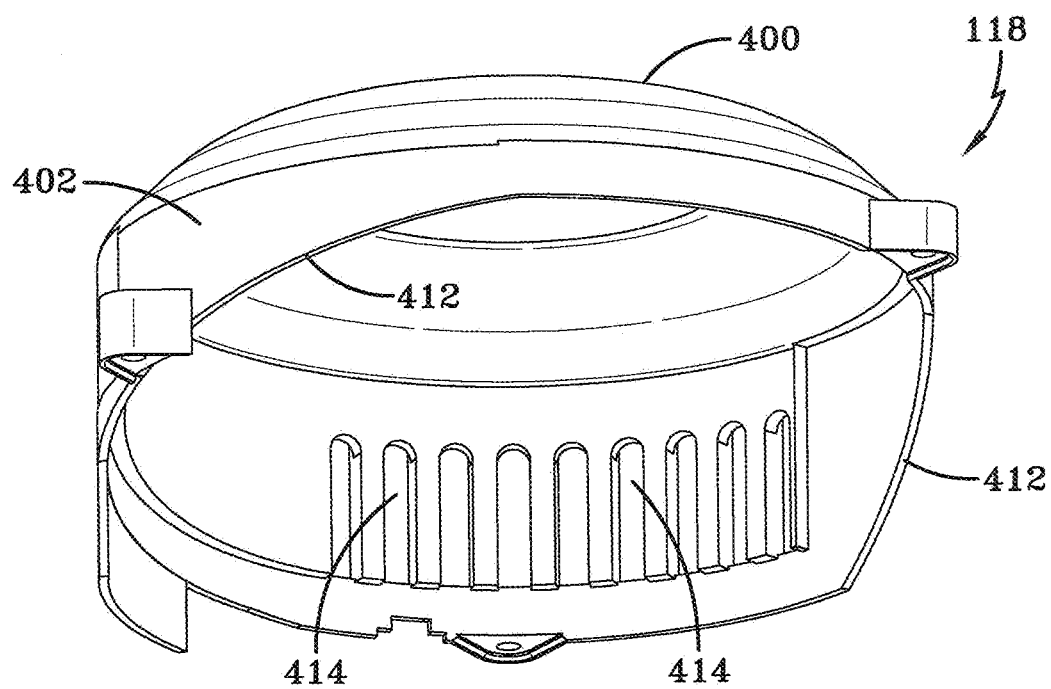
FIG. 18 is a bottom perspective view of the motor vent cover according to the concepts of the present invention.
Figure 19:
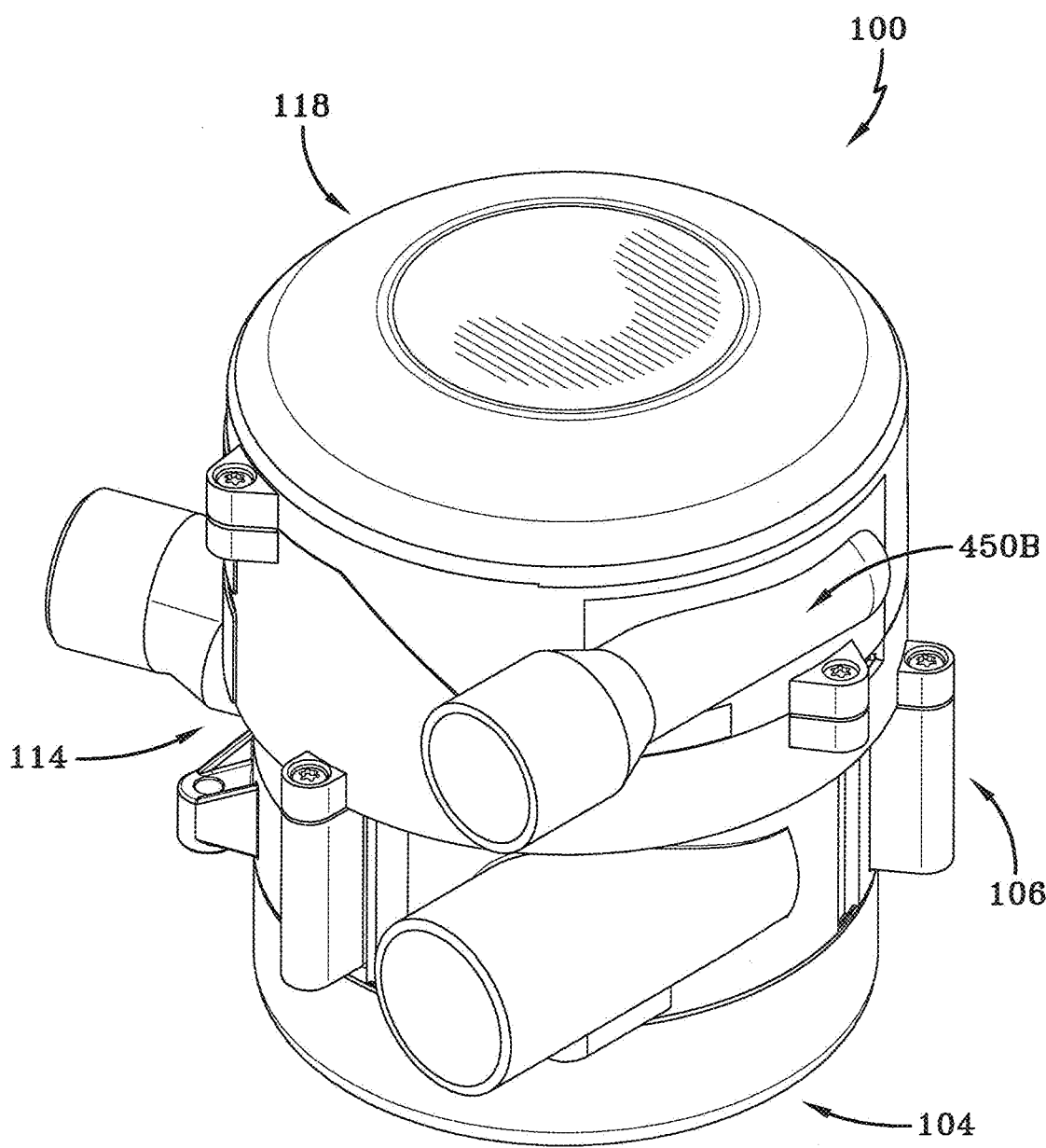
FIG. 19 is a perspective view of the motor-fan assembly according to the concepts of the present invention.
Figure 20:
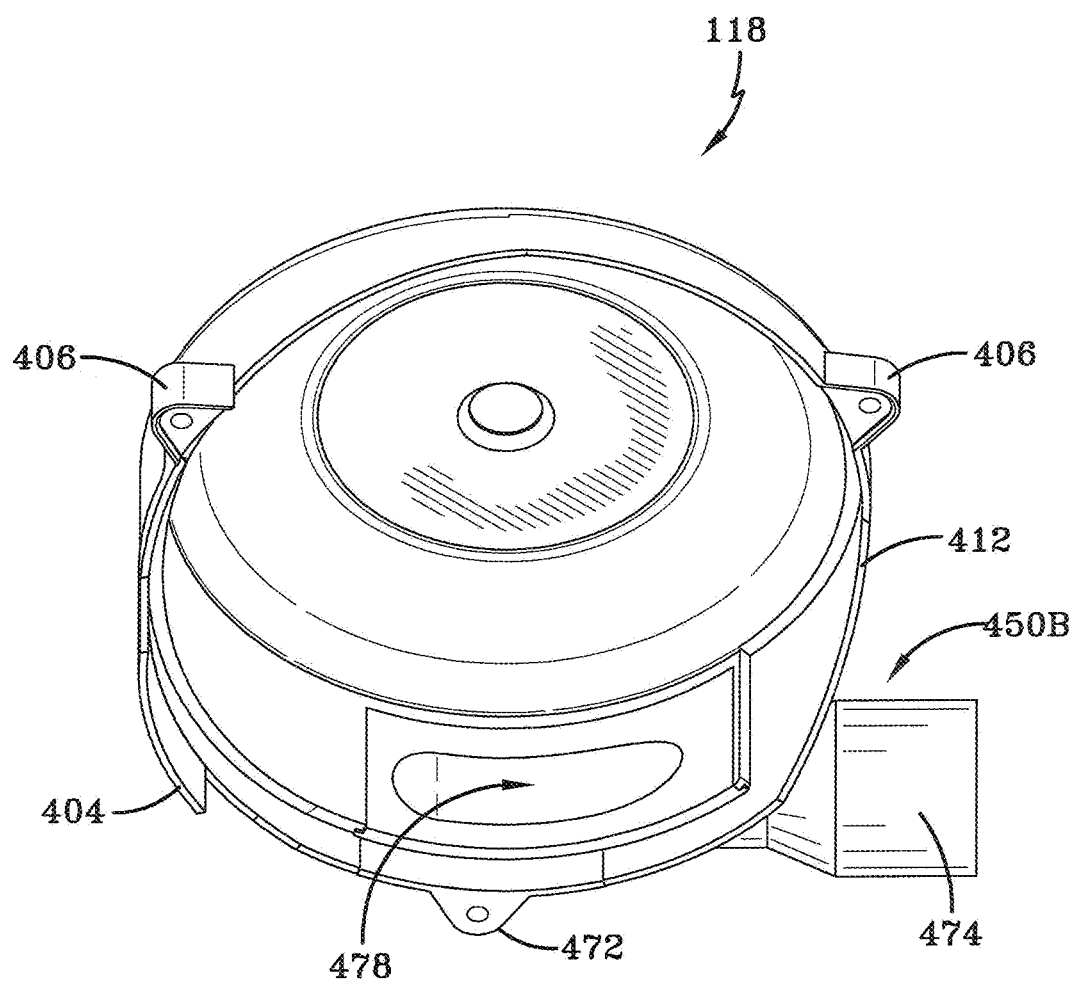
FIG. 20 is a bottom perspective view of the motor vent cover showing an outlet tube insert according to the concepts of the present invention.
Figure 21:
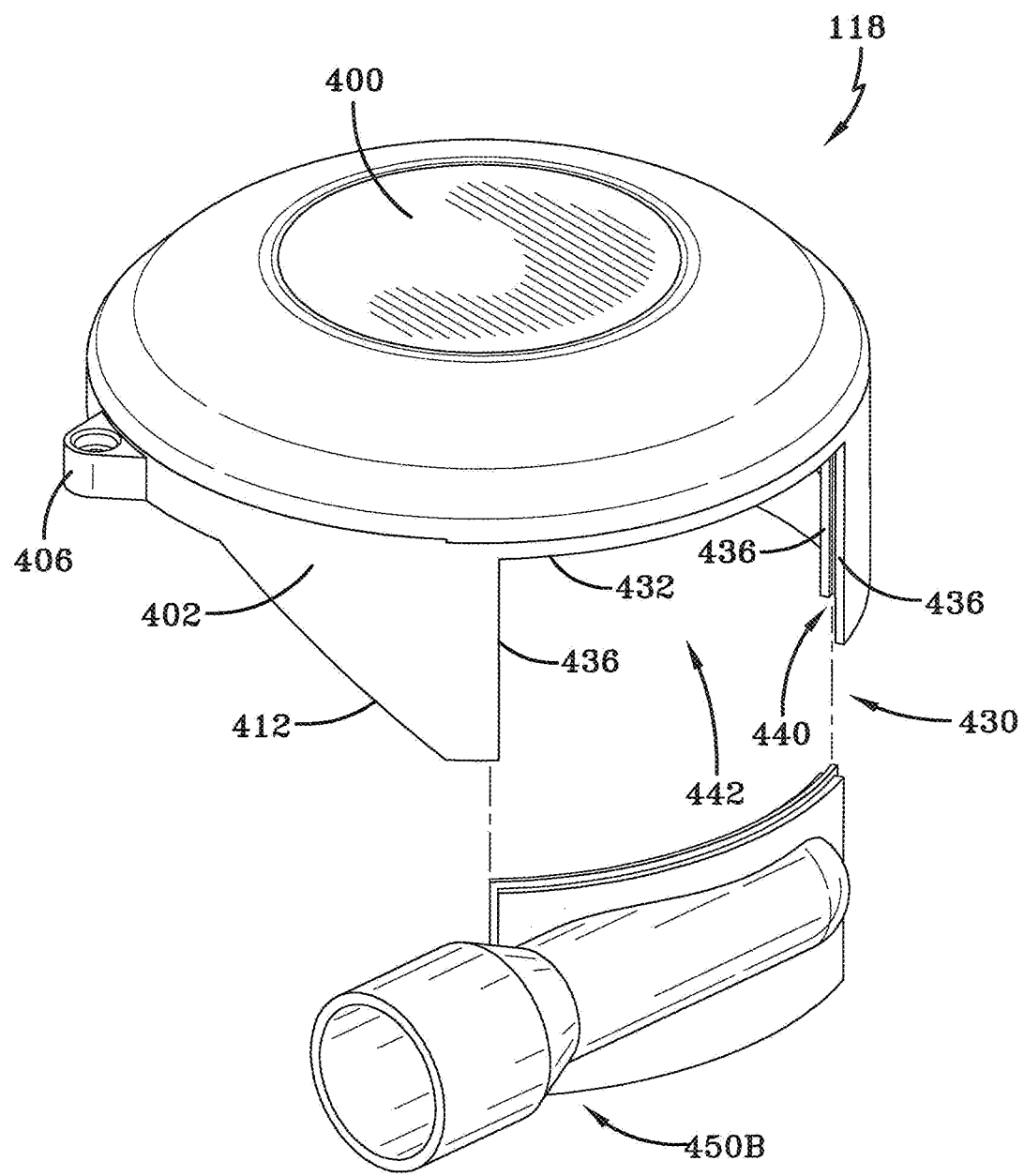
FIG. 21 shows the motor vent cover with the outlet tube insert exploded away from the motor vent cover according to the concepts of the present invention.

The cover wall 354 provides a number of outwardly radial external lugs 358 which receive fasteners for attachment to the blower housing 106 and, in particular, the external mounting lugs 152. When attached, connector openings 359 with the connector notches 196 may be formed to allow access to the connectors 320. Extending from the motor assembly side 350 to the cooling fan side 352 is a cover opening 360 which is axially aligned with the tubular core 256 and, in particular, the bearing holder 292. As best seen in FIG. 16, the shaft 112 extends through the cover opening 360. A spacer 361 may be secured to the shaft and may be positioned adjacent the retaining ring 332 and also extends through the cover opening 360. The cover wall provides for a partial inset wall 364 which is substantially aligned with the cover wall 354 and fits around an upper edge of the blower housing. An inset ledge 366 may be provided between the cover wall and the inset wall. Extending from the platform edge 356, which is perpendicular to the inset wall 364, is a platform surface 362 which substantially encloses the motor assembly 110. A portion of the platform surface is defined by a platform ramp edge 368, which is somewhat semi-circular. Extending from an outer edge of the platform surface 362 is a peripheral ramp surface 370. The ramp surface 370 includes an inner ramp wall edge 372 that is connected to the platform ramp edge 368 by a peripheral ramp wall 376. The ramp surface 370 also includes an outer ramp wall edge 373 that connects to at least the partial inset wall 364. In any event, the ramp surface 370 extends peripherally downwardly to a landing 374. The ramp surface 370 extends laterally between the peripheral ramp wall 376, which starts at the platform surface 362, and the partial inset wall 364. The ramp wall 376 may provide an outward flare 378 which intersects the inset ledge 366. Extending inwardly from the platform surface 362 at the opening 360 is a collar 379, which is positioned in proximity to the cup face 338, wherein the face vents 342 are aligned within a cylindrical extension of the collar 379. However, there is enough of a clearance between the cup face 338 and the collar 379 to allow cooling airflow to also pass therebetween. An underside of the platform surface 362 and an interior surface of the cover wall 356 form a motor assembly chamber 380 on the side opposite the cooling fan side 352, wherein the motor assembly chamber 380 substantially encloses the rotor assembly 330 and the circuit board 300 of the motor assembly.

As best seen in FIG. 16, the cooling fan assembly 116 extends away from the motor cover, and in particular the cooling fan side 352 of the cover 114. The spacer 361, as previously discussed, is secured to an end of the shaft 112 wherein a fastener secures a cooling fan 384 to the shaft by a nut or other mechanism. The cooling fan includes a fan plate 390 which is secured by the nut to the rotatable shaft. Extending from the fan plate 390 are a plurality of curvilinear vanes 392 which on their opposite edge are connected to an entry plate 394 which has an axial opening 396 that faces and is axially aligned with the cover opening 360.

Referring now to FIGS. 2-3 and 16-18, it can be seen that the motor vent cover 118 is secured onto the fan-motor assembly and, in particular, over the motor cover 114 with the cooling fan assembly therebetween. The motor vent cover includes a top 400 from which extends a cylindrical side wall 402 that has a lower edge 404. A plurality of external lugs 406 may extend from a top edge of the side wall 402 for attachment to the motor cover 114. The side wall 402 also provides a cover ramp edge 412 which matches the inset ledge 366 when the motor vent cover and motor cover are assembled to one another. A plurality of vents 414 may be provided in the side wall 402 and are aligned with the ramp surface 370. Together the motor cover and the motor vent cover form a cover chamber 420. It will further be appreciated that when the motor vent cover is secured to the blower housing that connector ports 422 may be formed so as to allow connection to the circuit board connectors 320 to monitor performance thereof. It will also be appreciated that the DIP switches 322 will be enclosed so that the motor's performance is not inadvertently changed.

In some embodiments the motor vent cover 118 may provide for an insert frame 430. As with the blower housing, the vents in the side wall of the motor vent cover 118 may be replaced with a vent insert or a tube insert so as to allow for connection of an insertable vent or insertable tube so that the cooling airflow may connect to a tube that delivers the cooling airflow away from a dirty environment to an environment positioned away from the motor-fan assembly. As best seen in FIGS. 19-22, an insert frame 430 may be provided by the motor vent cover which includes a frame bottom edge 432 which provides for an insert step. A pair of opposed insert tracks 436 extend from each end of the edge 432 wherein the tracks each provide a track groove 440 therebetween. Together the bottom edge 432 and the tracks 436 provide for an insert opening 442. The insert frame 430 is then able to receive an outlet insert 450. In one embodiment the outlet insert is an outlet vent insert 450A and in another embodiment the outlet insert is an outlet tube insert 450B.

Figure 22A:
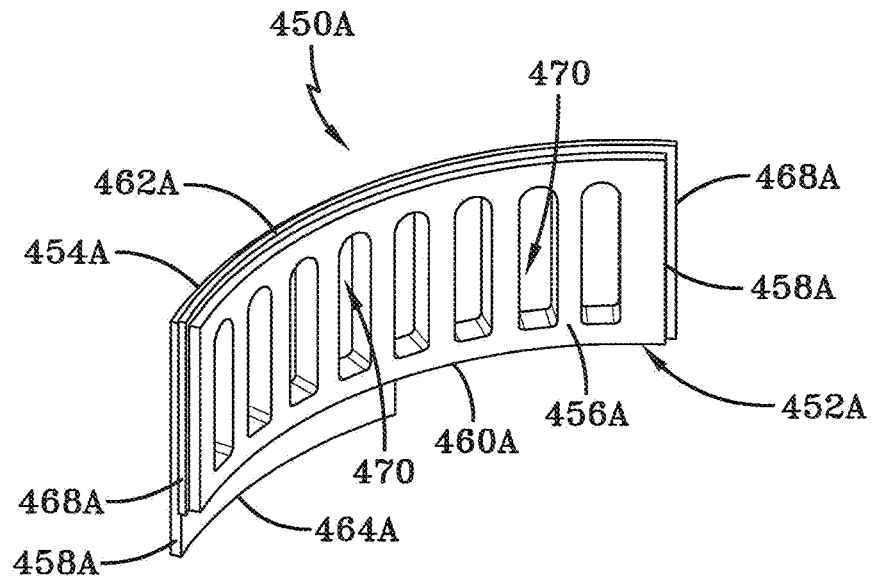
FIG. 22A is a rear perspective view of an outlet vent insert according to the concepts of the present invention.
Figure 22B:
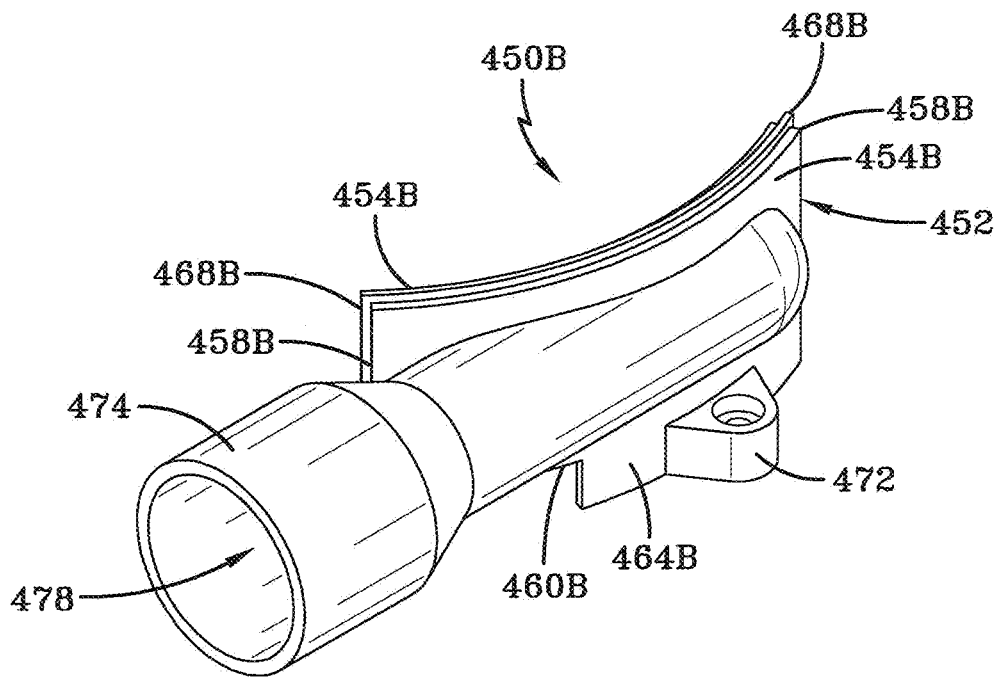
FIG. 22B is a front perspective view of the outlet tube insert according to the concepts of the present invention.

As best seen in FIG. 22A the outlet vent insert 450A includes a body 452A with a slight curvature to match the outer curvature of the motor vent cover. The insert 450A includes an outer facing surface 454A opposite an inner facing surface 456A. Connecting the surfaces to one another are a pair of opposed side edges 458A, a bottom edge 460A, and a top edge 462A which connect the surfaces to one another. An insert wall 464A may extend from the bottom edge 460A. Provided on the side edges are a pair of insert rails 468A which are received into the corresponding track grooves 440 and wherein the body includes vent openings 470 that extend between the facing surfaces 454A and 456A. A lug 472 may extend from the outer facing surface 454A.

In the alternative, the outlet tube insert 450B has substantially the same structure as the insert 450A except for the provision of a body 452B which includes a tube 474 that extends from the outer facing surface 454B that provides for a tube opening 478.

Either insert 450A or 450B is secured in the insert frame 430 when the motor vent cover is secured to the motor cover and/or the blower housing. The motor cover provides an edge which aligns with the bottom edge 460 so as to exert a sealing force on the respective insert. A fastener is inserted through the lug 472 and received in a corresponding lug 358 provided by the motor cover 114.

Figure 23:
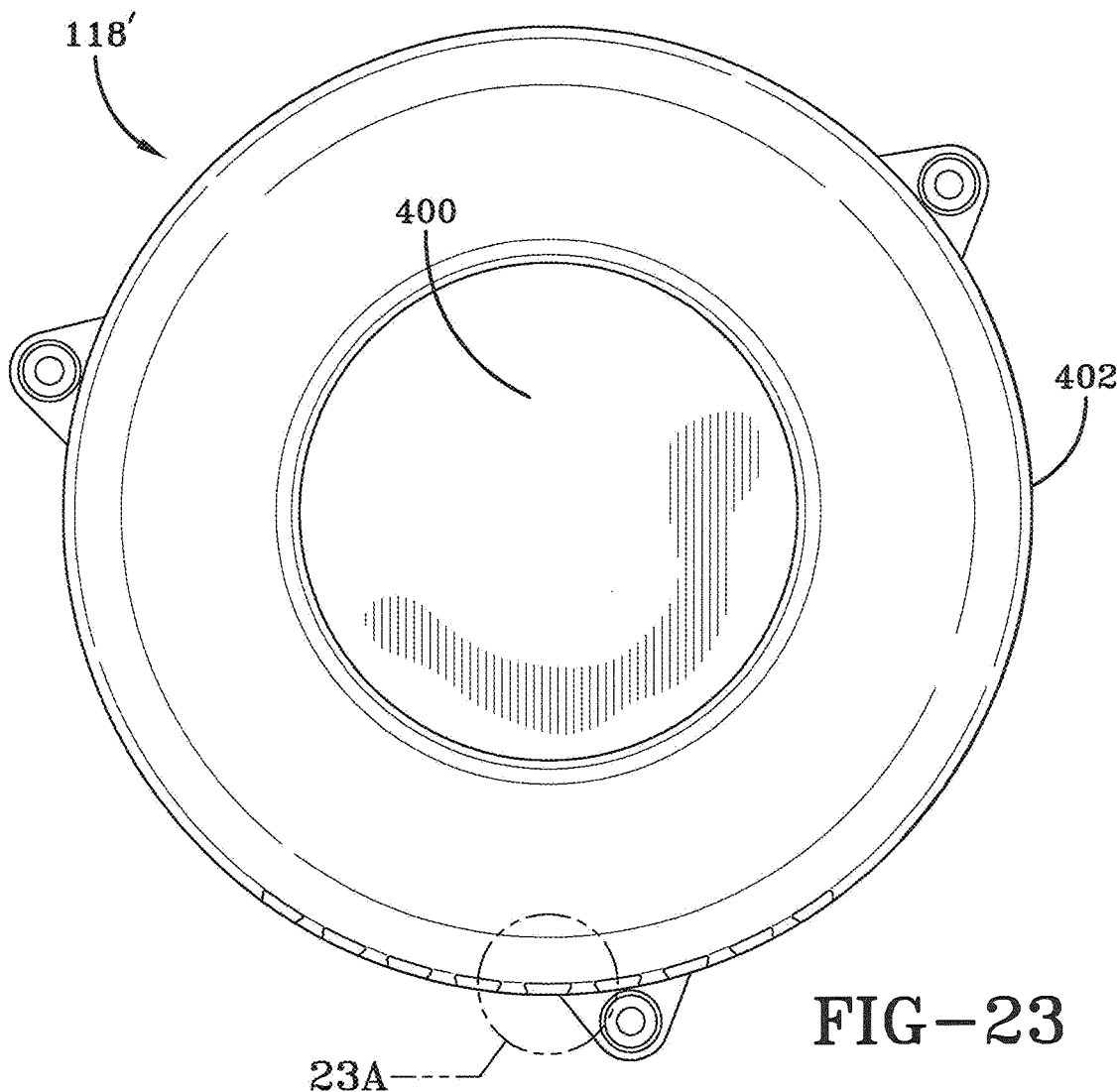
FIG. 23 is a top view of an alternative motor vent cover utilized in the motor-fan assembly according to the concepts of the present invention.
Figure 23A:
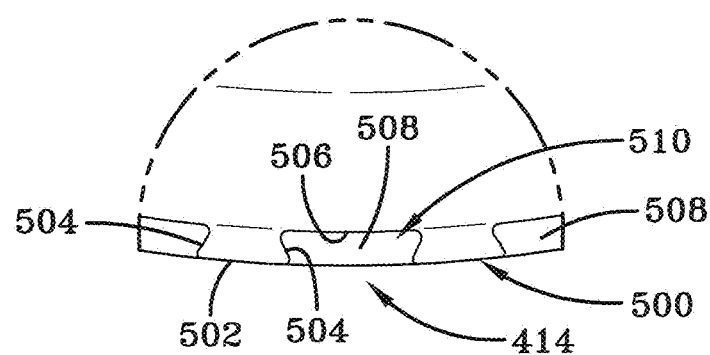
FIG. 23A is an enlarged view of one-half of a sliding dovetail joint provided in the alternative motor vent cover according to the concepts of the present invention.
Figure 24:
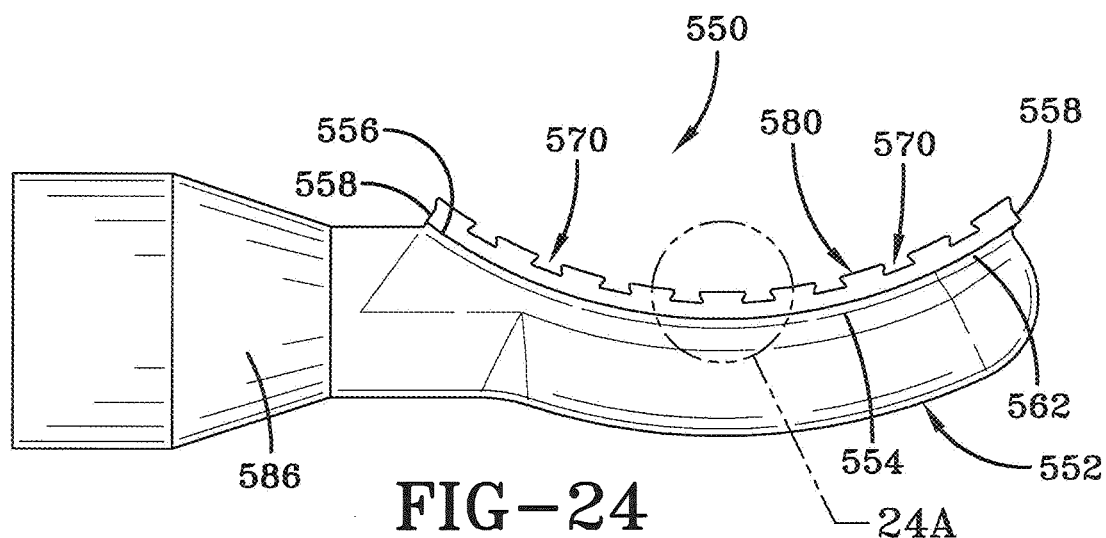
FIG. 24 is a top view of a slide-on outlet tube insert according to the concepts of the present invention.
Figure 24A:
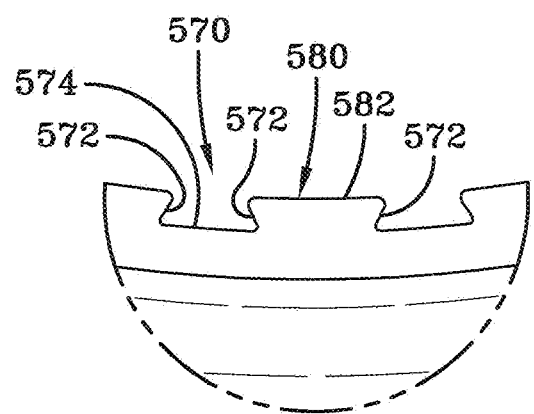
FIG. 24A is an enlarged view of a mating half of a sliding dovetail joint provided in the slide-on tube insert according to the concepts of the present invention.
Figure 25:
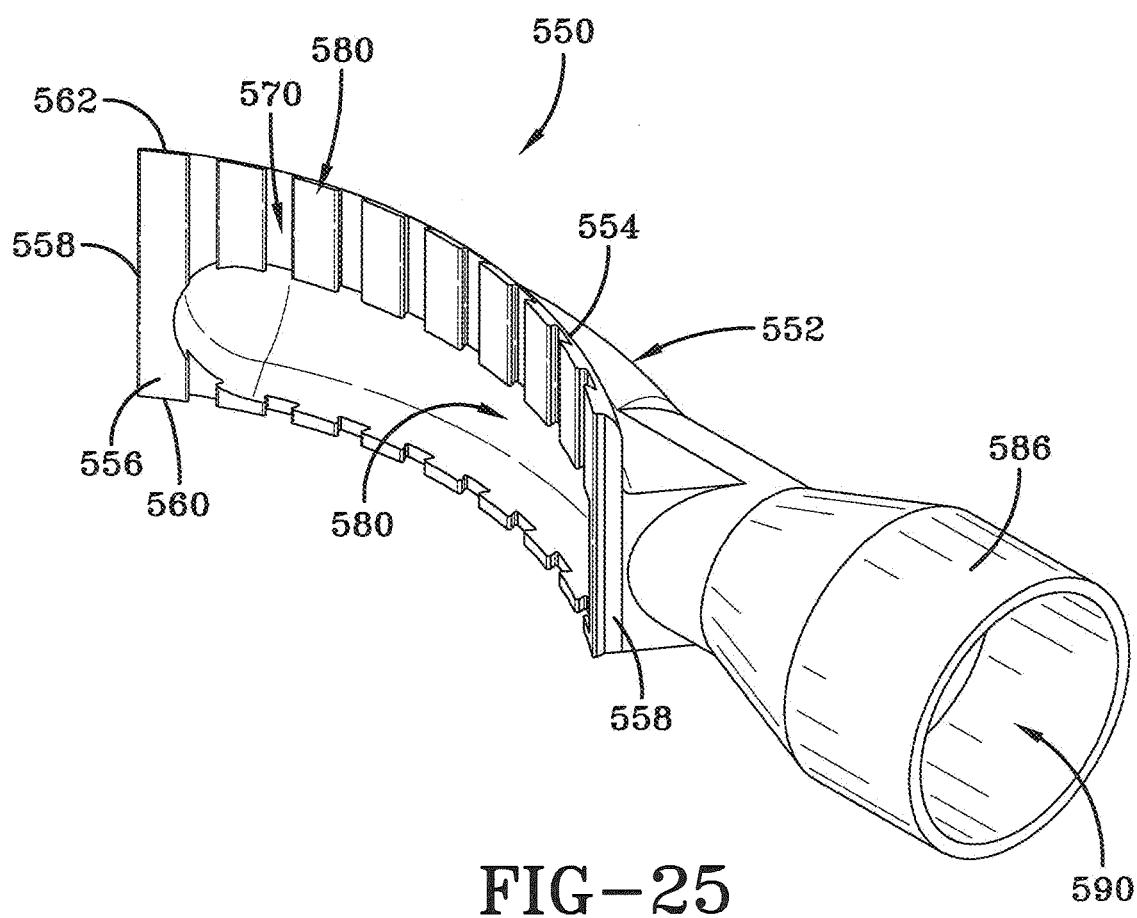
FIG. 25 is a rear perspective view of the slide-on tube insert according to the concepts of the present invention.
Figure 26:
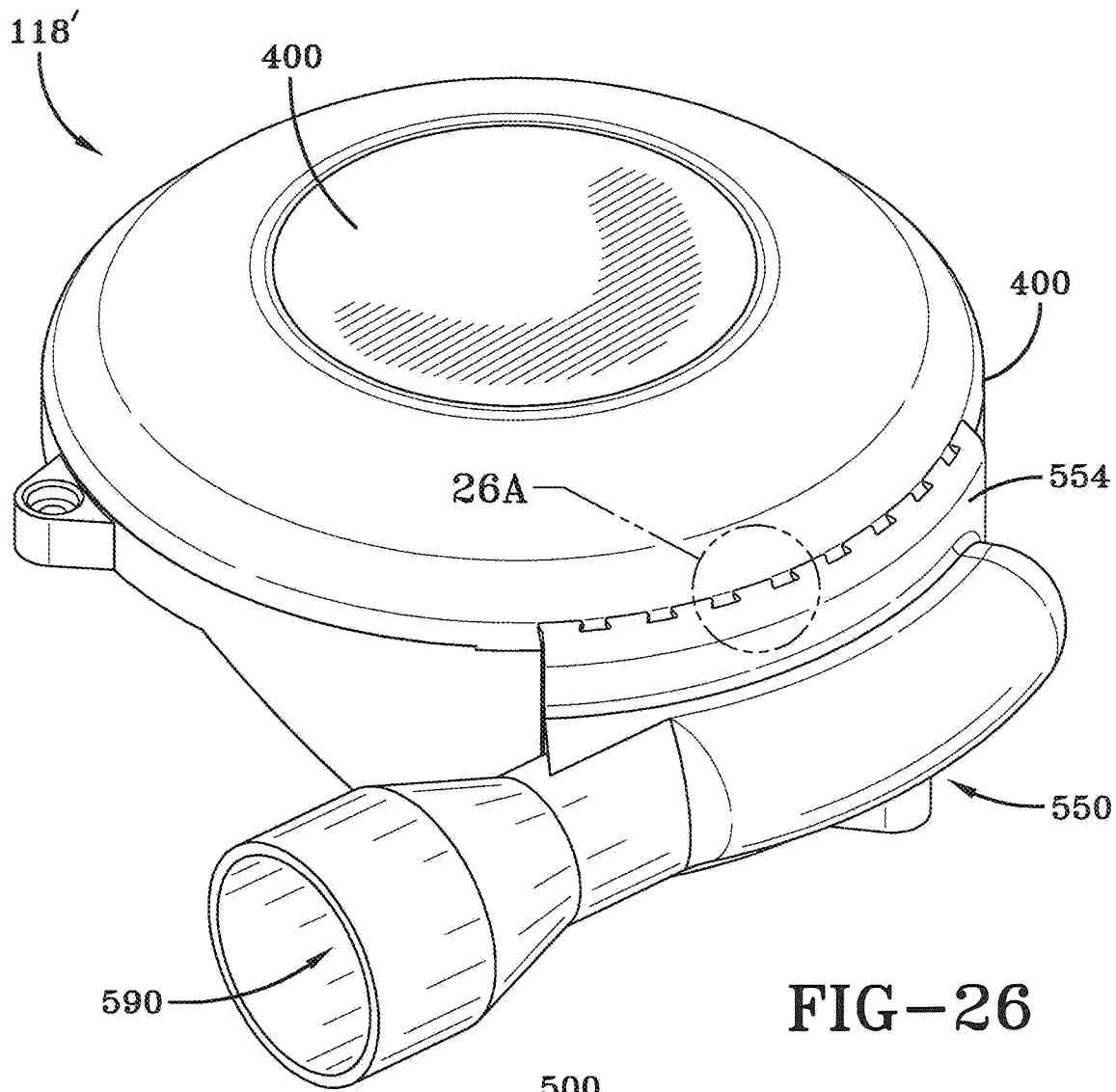
FIG. 26 is a top perspective view of the slide-on tube insert assembled to the alternative motor vent cover according to the concepts of the present invention.
Figure 27:
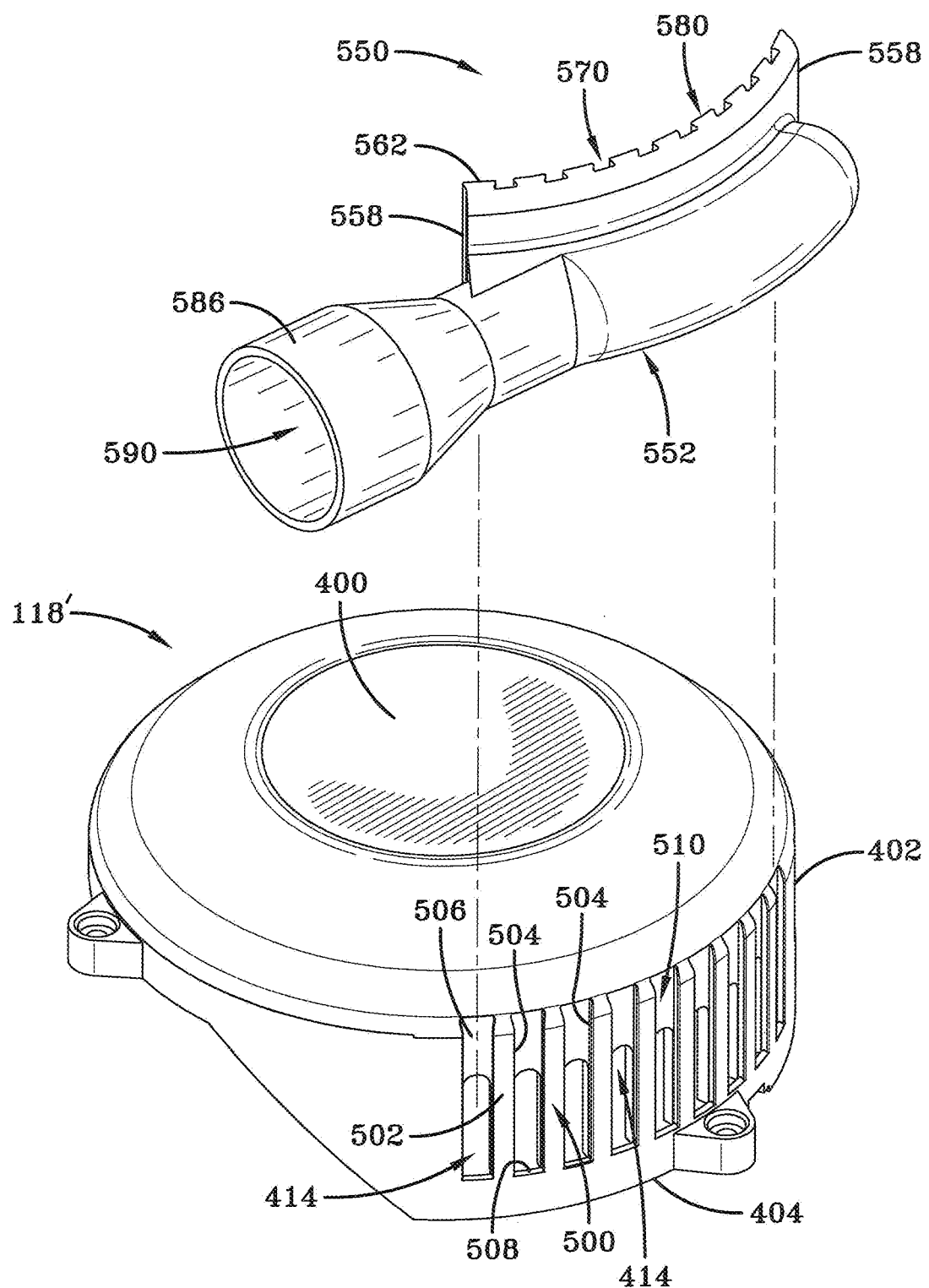
FIG. 27 is an exploded perspective view of the slide-on tube insert and the alternative motor vent cover according to the concepts of the present invention.

Referring now to FIGS. 23-27, it can be seen that an alternative construction for securing a slide-on outlet tube insert on to a motor vent cover is shown. In this embodiment a motor vent cover is designated generally by the numeral 118' as best seen in FIGS. 23, 23A and 27. Unless designated otherwise, the motor vent cover 118' provides for substantially the same component pieces as the motor vent cover 118. The cover 118' is substantially the same as the vent cover 118, but with a slightly different configuration of the vent openings. The cover 118' includes a top 400 with a substantially cylindrical sidewall 402. In the present embodiment, the vents 414 are formed by a plurality of posts designated generally by the numeral 500, wherein the posts are spaced apart and extend between the lower edge 404 and the top 400. Each post 500 provides for a face 502, wherein each face has inwardly directed sidewalls 504 which extend from each edge of the face. A recess surface 506 forms a top edge of the vent 414 while a stop edge 508 is disposed opposite the top edge of the vent and connects the opposed sidewalls 504 to one another. Together, the adjacent recess surface 506, the sidewalls 504, and the stop edge 508 form a sliding dovetail socket 510. Any number of sockets 510 may be provided. Moreover, each socket 510 is aligned with a corresponding vent 414.

As best seen in FIGS. 24, 24A, 25, and 27, a slide-on outlet tube insert is designated generally by the numeral 550. The insert 550 is similar in construction to the insert 450B but is provided with structural features which are slidably received in the sockets 510 of the cover 118'. The outlet tube insert 550 includes a body 552 with structural features similar to the insert 450B. The body 552 provides an outer facing surface 554 which is opposite an inner facing surface 556. Connecting the surfaces 554 and 556 to one another are a pair of opposed side edges 558, a bottom edge 560, and a top edge 562. The body 552 provides a plurality of notches 570 which are spaced apart along the inner facing surface 556 along the bottom edge 560 and the top edge 562. Each notch provides for an inwardly extending sidewall 572 which is connected by an inward surface 574 that connects the sidewalls 572 to one another. On either or both sides of each notch 570 is a tail 580. Each tail 580 has a face surface 582 that connects the sidewalls 572 of adjacent notches 570 to one another. The tube insert 550 provides for a tube 586 that extends from the outer facing surface and provides for a tube opening 590. As best seen in FIG. 25, the tails 580 and the notches 570 extend along the inner facing surface 556 from the top edge 562 to the bottom edge 560, wherein the tails 580 and the notches 570 are interrupted by the tube opening 590.

Figure 26A:
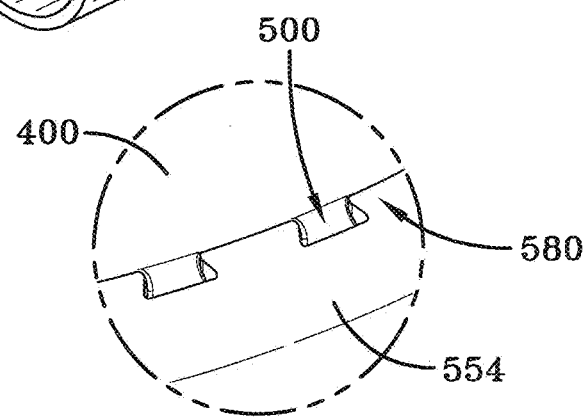
FIG. 26A is an enlarged view of the sliding dovetail joint that connects the slide-on tube insert to the alternative motor vent cover according to the concepts of the present invention.

As best seen in FIGS. 26, 26A and 27, the slide-on outlet tube insert 550 may be positioned onto the motor vent cover 118. In particular, the notches 570 are received on the posts 502. In a corresponding manner, the tails 580 are received in the sockets 510. This forms a sliding dovetail joint that secures the slide-on tube insert to the motor vent cover. Once installed, application of an outward radial force on the tube insert will not dislodge it from the motor vent cover. As a result, the vents 414 are aligned and contiguous with the tube opening 590 to allow the cooling airflow to be exhausted through the outlet insert. The inward side walls 504 and 572 may be sized to provide a robust frictional fit between the sockets 510 and the tails 580 to prevent inadvertent dis-assembly of the insert 550 from the motor vent cover 118'. This provides for an add-on embodiment that allows for the motor vent cover to be employed and without having to utilize separate inserts that require the disassembly of the motor vent cover from the rest of the motor-fan assembly.

Generally, in referring to FIGS. 2 and 3, the operation of the motor-fan assembly is as follows. With energization of the motor assembly, the shaft is rotated so as to rotate the fans in both the working fan assembly and the cooling air fan assembly. In regard to the working fan assembly, working air is drawn in axially through the axial opening 124 and air travels through the rotating fan 128, the stationary fan 130, and the rotating fan 132 and into the working fan side 156 of the blower housing 106. The blower housing 106 provides for a volute 164 which captures the air exhausted by the rotating fan 132 and the working air travels through the volute and out the port opening 168.

As the shaft rotates, the cooling air fan assembly is also operating. In the present embodiment, the cooling air fan 384 generates a reverse air flow and, as such, air is pulled through the motor-fan assembly as opposed to being drawn in axially from the motor vent cover. Specifically, cooling air enters through the blower housing 106 and, in particular, through the inlet vent insert 200A or the inlet tube insert 200B. The inserts are positioned on the outer wall 150 on the motor side 158 of the blower housing. Air travels into and through the blower housing chamber 174 along the volute wall 172. If provided, the deflector wall 179 may partially re-direct the cooling airflow within the chamber 174. Airflow migrates through the chamber and into the motor assembly 110 and, in particular, along the tubular core 256 and through the vents provided by the mounting plate 252. For air that travels along the tubular core 256, it exits through the mounting plate vents 278 disposed between the tubular core and the mounting plate 252. The scallop 294 allows for the air that flows through these vents to be redirected over the components provided on an underside of the circuit board. The vents that extend through the mounting plate and adjacent the heatsink flow over the components of the circuit board which generate the most heat and then from there into the area surrounding the rotor cup and into the motor assembly chamber 380. The airflow may also proceed through the scallop-board gap 328 to flow over the cooling fan side 304 of the circuit board 300. The cooling air then is drawn through the motor cover by the cooling fan and, in particular, through the cover opening 360. The cooling air then impacts the underside of the top vent of the motor vent cover and then is pushed out through the peripheral ramp surface 370 and peripheral ramp wall 376 toward the vents 414. Alternatively, the exhausted air may be expelled through the outlet vent insert 450A or, if provided, the outlet tube insert 450B.

As can be seen from the above, the present invention is advantageous in that the motor cover and the motor vent cover operate together to improve airflow through the motor assembly, reduce noise, and protect the cooling fan assembly. In particular, the motor-fan assembly described above is advantageous in that the motor cover substantially encloses the motor assembly wherein the motor cover has a cover opening extending therethrough and wherein a cooling fan assembly is rotated by a shaft that extends through the cover opening. The cooling fan, which is disposed between the motor cover and the motor vent cover, draws cooling airflow over the motor assembly. The motor vent cover provides a cooling air outlet through which the cooling airflow is exhausted. It will further be appreciated that the motor cover is configured with a platform surface through with the cover opening extends and a peripheral ramp surface extending from the platform surface wherein cooling airflow exhausted radially from the at least one cooling fan flows along the peripheral ramp surface toward the cooling air outlet which may extend radially through the motor vent cover. Together the motor cover and the motor vent cover facilitate airflow and reduce noise.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:
1. A motor-fan assembly, comprising:
a brushless motor assembly having a stator assembly and a rotor assembly which rotates a rotatable shaft extending therethrough;
a blower housing supporting said brushless motor assembly, said blower housing having an internal chamber wall and a cooling air inlet;
a working fan assembly having a working air inlet and at least one working fan rotated by said rotatable shaft, said working fan assembly carried by said blower housing which has a working air outlet, wherein rotation of said at least one working fan draws working air into said working air inlet and exhausts working air through said working air outlet;
a motor cover supported by said blower housing and substantially enclosing said brushless motor assembly without contacting said stator assembly or said rotor assembly, said motor cover having a cover opening extending therethrough, which is formed by a cover opening collar, wherein said rotatable shaft extends through said cover opening with a clearance between said cover opening collar and said shaft;
a cooling fan assembly having at least one cooling fan rotated by said rotatable shaft, said at least one cooling fan drawing cooling airflow through said cooling air inlet, over said brushless motor assembly and through said clearance; and
a motor vent cover coupled to said motor cover with said at least one cooling fan therebetween, said motor vent cover having a cooling air outlet through which cooling airflow is exhausted from said clearance, and wherein said internal chamber wall separates and isolates the cooling air from the working air;
wherein said motor cover comprises:
a cover wall having a platform edge;
a platform surface extending from said platform edge, said cover opening extending through said platform surface; and
a peripherally downward ramp surface extending from said platform surface, wherein cooling airflow is exhausted radially from said at least one cooling fan and flows radially along said platform surface and then helically along said peripherally downward ramp surface toward said cooling air outlet.

2. The motor-fan assembly according to claim 1, wherein said motor cover further comprises:
a peripheral ramp wall extending substantially perpendicularly between said platform surface and said peripherally downward ramp surface, wherein a platform ramp edge intersects said platform surface and said peripheral ramp wall.

3. The motor-fan assembly according to claim 2, wherein said at least one cooling fan has a diameter that is no larger than a radial distance from said rotatable shaft to said platform ramp edge.

4. The motor-fan assembly according to claim 1, wherein said motor cover has an inset wall extending inwardly from said cover wall, and wherein an inset step extends substantially perpendicularly between said inset wall and said cover wall.

5. The motor-fan assembly according to claim 4, wherein said motor vent cover has a lower edge that aligns with said inset step when said motor vent cover is assembled to said motor cover.

6. The motor-fan assembly according to claim 1, wherein said cover opening collar extends inwardly.

7. The motor-fan assembly according to claim 1, wherein said motor cover has a plurality of outwardly extending motor cover mounting lugs.

8. The motor-fan assembly according to claim 1, wherein said cooling fan extends away from said motor cover and has an entry plate with an axial opening, said entry plate connected to a fan plate with a plurality of curvilinear vanes, wherein said axial opening is aligned with said clearance, and wherein cooling airflow is exhausted radially from said plurality of curvilinear vanes.

9. A motor-fan assembly, comprising:
a brushless motor assembly having a stator assembly and a rotor assembly which rotates a rotatable shaft extending therethrough;
a blower housing supporting said brushless motor assembly, said blower housing having an internal chamber wall and a cooling air inlet;
a working fan assembly having a working air inlet and at least one working fan rotated by said rotatable shaft, said working fan assembly carried by said blower housing which has a working air outlet, wherein rotation of said at least one working fan draws working air into said working air inlet and exhausts working air through said working air outlet;
a motor cover supported by said blower housing and substantially enclosing said brushless motor assembly without contacting said stator assembly or said rotor assembly, said motor cover having a cover opening extending therethrough, which is formed by a cover opening collar, wherein said rotatable shaft extends through said cover opening with a clearance between said cover opening collar and said shaft;
a cooling fan assembly having at least one cooling fan rotated by said rotatable shaft, said at least one cooling fan drawing cooling airflow through said cooling air inlet, over said brushless motor assembly and through said clearance; and
a motor vent cover coupled to said motor cover with said at least one cooling fan therebetween, said motor vent cover having a cooling air outlet through which cooling airflow is exhausted from said clearance, and wherein said internal chamber wall separates and isolates the cooling air from the working air;
wherein said cover opening collar extends inwardly,
wherein said rotor assembly includes a rotor cup having a cup face with face vents extending therethrough, said face vents aligned with said cover opening.

10. The motor-fan assembly according to claim 9, wherein said motor vent cover has a plurality of vent cover lugs alignable with selected said motor cover mounting lugs which receive fasteners to secure said motor vent cover to said motor cover.

11. The motor-fan assembly according to claim 9, wherein said blower housing has a plurality of housing lugs alignable with selected said motor cover mounting lugs which receive fasteners to secure said motor cover to said blower housing.

12. A motor-fan assembly, comprising:
a brushless motor assembly having a stator assembly and a rotor assembly which rotates a rotatable shaft extending therethrough;
a blower housing supporting said brushless motor assembly, said blower housing having an internal chamber wall and a cooling air inlet;
a working fan assembly having a working air inlet and at least one working fan rotated by said rotatable shaft, said working fan assembly carried by said blower housing which has a working air outlet, wherein rotation of said at least one working fan draws working air into said working air inlet and exhausts working air through said working air outlet;
a motor cover supported by said blower housing and substantially enclosing said brushless motor assembly without contacting said stator assembly or said rotor assembly, said motor cover having a cover opening extending therethrough, which is formed by a cover opening collar, wherein said rotatable shaft extends through said cover opening with a clearance between said cover opening collar and said shaft;
a cooling fan assembly having at least one cooling fan rotated by said rotatable shaft, said at least one cooling fan drawing cooling airflow through said cooling air inlet, over said brushless motor assembly and through said clearance; and
a motor vent cover coupled to said motor cover with said at least one cooling fan therebetween, said motor vent cover having a cooling air outlet through which cooling airflow is exhausted from said clearance, and wherein said internal chamber wall separates and isolates the cooling air from the working air;
wherein said brushless motor assembly further comprises a radial mounting plate carrying said stator assembly, and wherein said radial mounting plate is supported by said blower housing and has a plurality of plate vents through which the cooling airflow passes.

13. A motor-fan assembly, comprising:
a brushless motor assembly having a stator assembly and a rotor assembly which rotates a rotatable shaft extending therethrough;

a blower housing supporting said brushless motor assembly, said blower housing having an internal chamber wall and a cooling air inlet;

a working fan assembly having a working air inlet and at least one working fan rotated by said rotatable shaft, said working fan assembly carried by said blower housing which has a working air outlet, wherein rotation of said at least one working fan draws working air into said working air inlet and exhausts working air through said working air outlet;

a motor cover supported by said blower housing and substantially enclosing said brushless motor assembly without contacting said stator assembly or said rotor assembly, said motor cover having a cover opening extending therethrough, which is formed by a cover opening collar, wherein said rotatable shaft extends through said cover opening with a clearance between said cover opening collar and said shaft;

a cooling fan assembly having at least one cooling fan rotated by said rotatable shaft, said at least one cooling fan drawing cooling airflow through said cooling air inlet, over said brushless motor assembly and through said clearance; and a motor vent cover coupled to said motor cover with said at least one cooling fan therebetween, said motor vent cover having a cooling air outlet through which cooling airflow is exhausted from said clearance, and wherein said internal chamber wall separates and isolates the cooling air from the working air;

wherein said motor cover comprises:

a platform surface, said cover opening extending through said platform surface;

a peripherally downward ramp surface extending from said platform surface; and a peripheral ramp wall extending substantially perpendicularly between said platform surface and said peripherally downward ramp surface, said peripheral ramp wall having an outward flare, wherein cooling airflow is exhausted radially and flows along said peripherally downward surface and said outward flare toward said cooling air outlet.

14. A motor-fan assembly, comprising: a brushless motor assembly having a stator assembly and a rotor assembly which rotates a rotatable shaft extending therethrough; a blower housing supporting said brushless motor assembly, said blower housing having an internal chamber wall and a cooling air inlet; a working fan assembly having a working air inlet and at least one working fan rotated by said rotatable shaft, said working fan assembly carried by said blower housing which has a working air outlet, wherein rotation of said at least one working fan draws working air into said working air inlet and exhausts working air through said working air outlet; a motor cover supported by said blower housing and substantially enclosing said brushless motor assembly without contacting said stator assembly or said rotor assembly, said motor cover having a cover opening extending therethrough, which is formed by a cover opening collar, wherein said rotatable shaft extends through said cover opening with a clearance between said cover opening collar and said shaft; a cooling fan assembly having at least one cooling fan rotated by said rotatable shaft, said at least one cooling fan drawing cooling airflow through said cooling air inlet, over said brushless motor assembly and through said clearance; and a motor vent cover coupled to said motor cover with said at least one cooling fan therebetween, said motor vent cover having a cooling air outlet through which cooling airflow is exhausted from said clearance, and wherein said internal chamber wall separates and isolates the cooling air from the working air; wherein said motor cover comprises: a platform surface, said cover opening extending through said platform surface, wherein said cooling fan extends above and away from said platform surface; and a peripherally downward ramp surface extending from said platform surface, wherein cooling airflow is exhausted from said at least one cooling fan radially along said platform surface and then helically along said peripherally downward ramp surface toward said cooling air outlet.

\* \* \* \* \*